United States Patent

Elder

[11] Patent Number: 5,794,849
[45] Date of Patent: *Aug. 18, 1998

[54] PULSED IRRIGATION CONTROL VALVE WITH PRESSURE RELIEF

[76] Inventor: Jack E. Elder, 284 Olivewood Ct., Rochester, Mich. 48306

[*] Notice: The term of this patent shall not extend beyond the expiration date of Pat. No. 5,465,905.

[21] Appl. No.: 558,168

[22] Filed: Nov. 13, 1995

Related U.S. Application Data

[63] Continuation-in-part of Ser. No. 214,813, Mar. 17, 1994, Pat. No. 5,465,905.

[51] Int. Cl.⁶ .................................................. B05B 1/08
[52] U.S. Cl. ..................... 239/99; 239/444; 239/570; 239/542
[58] Field of Search ................. 239/99, 101, 533.1, 239/533.15, 75, 436, 443, 444, 542, 446, 570, 572; 251/45, 75, 61.2, 61.3; 137/510

[56] References Cited

U.S. PATENT DOCUMENTS

| | | |
|---|---|---|
| 1,783,646 | 12/1930 | Hajek . |
| 2,902,048 | 9/1959 | Ryan, Jr. . |
| 3,053,461 | 9/1962 | Inglis . |
| 3,547,355 | 12/1970 | Salazar . |
| 3,757,866 | 9/1973 | Mears et al. . |
| 3,841,558 | 10/1974 | Fowler et al. . |
| 3,856,206 | 12/1974 | Bell et al. . |
| 4,177,947 | 12/1979 | Menzel . |
| 4,265,405 | 5/1981 | Takagi . |
| 4,643,355 | 2/1987 | Sanders et al. . |
| 4,781,217 | 11/1988 | Rosenberg . |
| 4,838,485 | 6/1989 | Rinkewich . |
| 4,846,406 | 7/1989 | Christy . |
| 4,863,101 | 9/1989 | Pater et al. . |
| 4,869,432 | 9/1989 | Christy . |
| 4,955,539 | 9/1990 | Ruttenberg . |
| 4,998,558 | 3/1991 | Solomon . |
| 5,249,745 | 10/1993 | Bertolotti . |
| 5,314,116 | 5/1994 | Krauth et al. . |

FOREIGN PATENT DOCUMENTS

| | | |
|---|---|---|
| 2037324 | 2/1971 | Germany . |
| 2036462 | 1/1972 | Germany . |
| 104482 | 1/1993 | Israel . |

Primary Examiner—Kevin Weldon

[57] ABSTRACT

The present invention provides an irrigation control valve for converting water supplied to the irrigation control valve at a constant, low-volume flow rate into a pulsed, high-volume flow rate discharge. The irrigation control valve includes a control valve body having an inlet coupled to the water supply tube, an accumulation chamber, a mist port and a mist valve assembly for intermittently discharging the water from the accumulation chamber out of the mist port. The irrigation control valve further includes a pressure relief valve assembly operably coupled to the water supply tube for relieving the pressure within the accumulation chamber when the irrigation control valve is not in use.

22 Claims, 9 Drawing Sheets

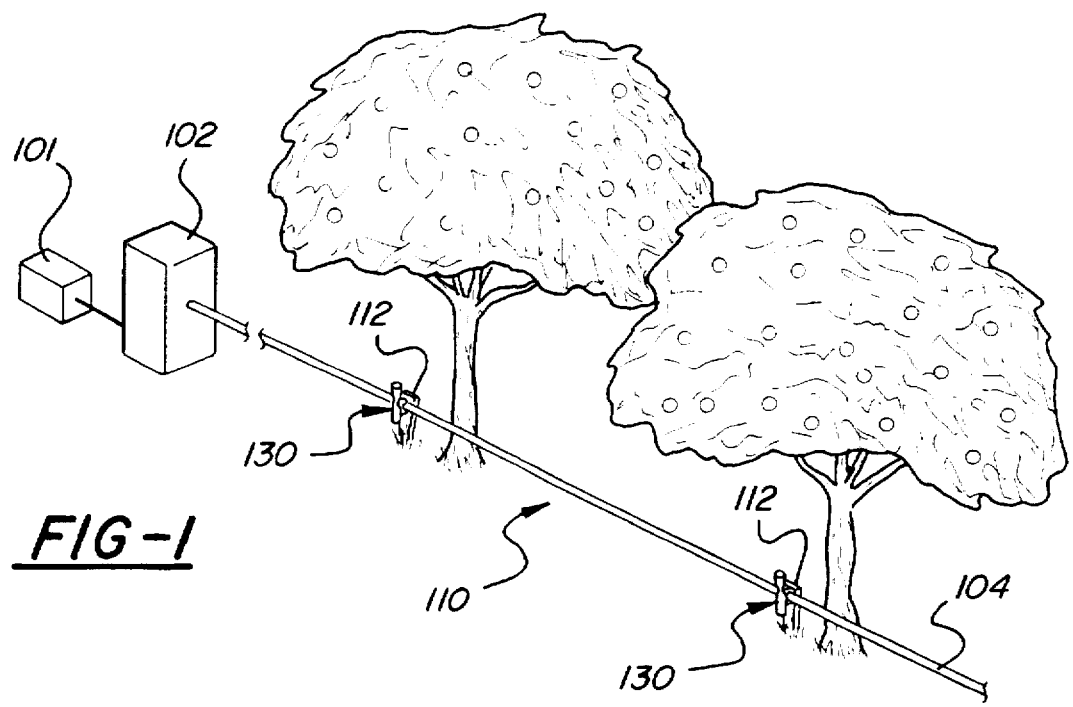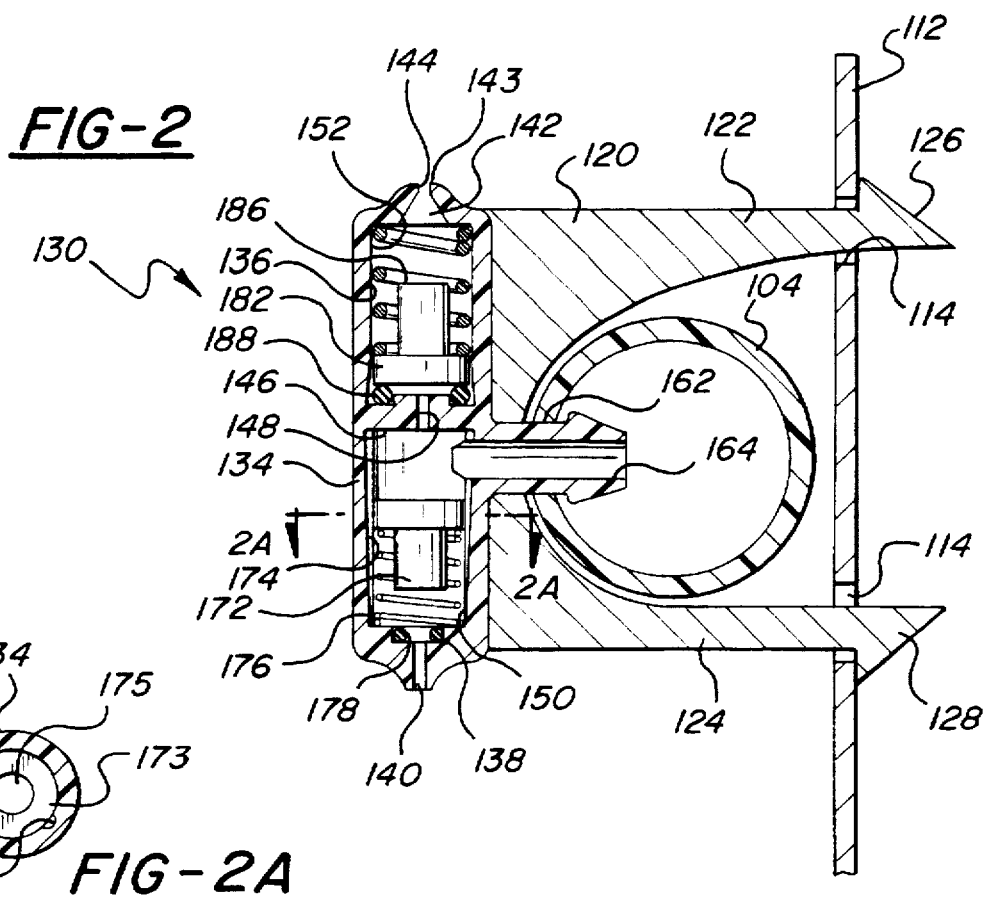

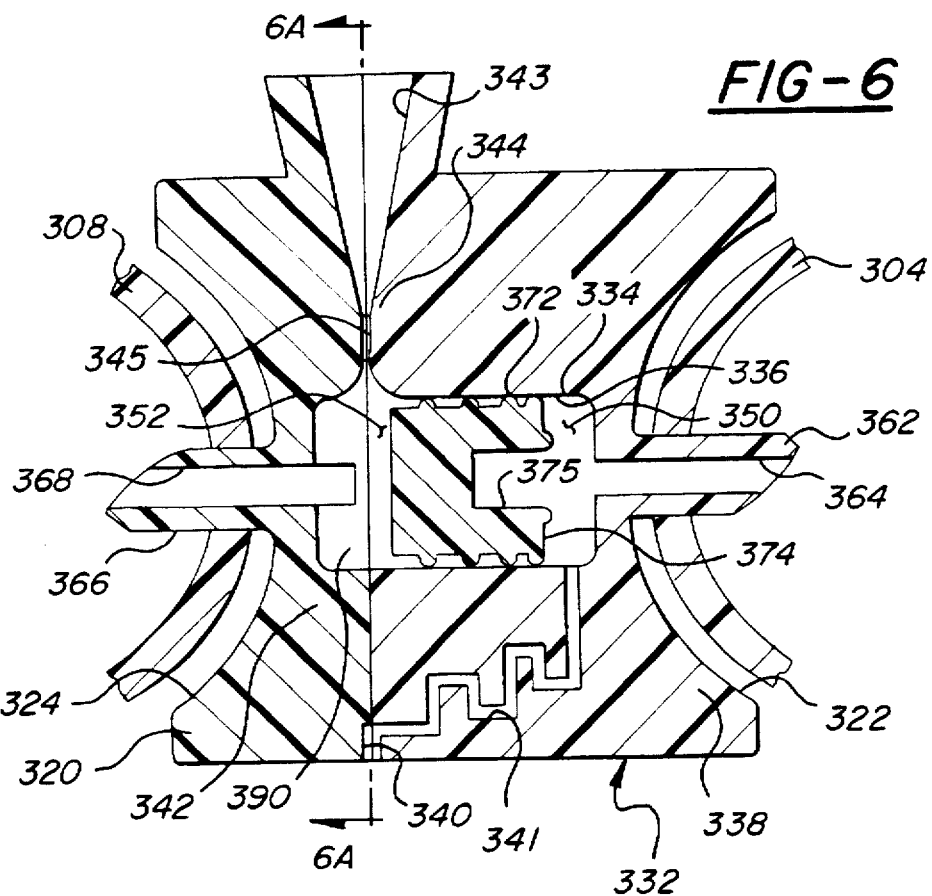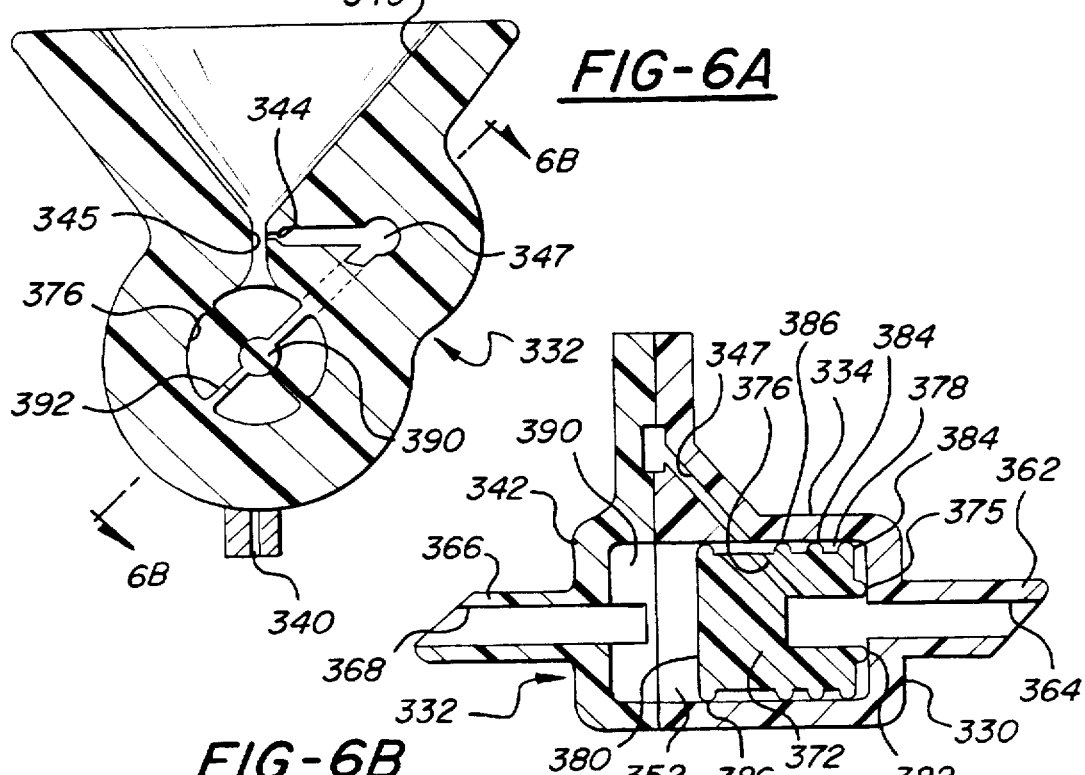

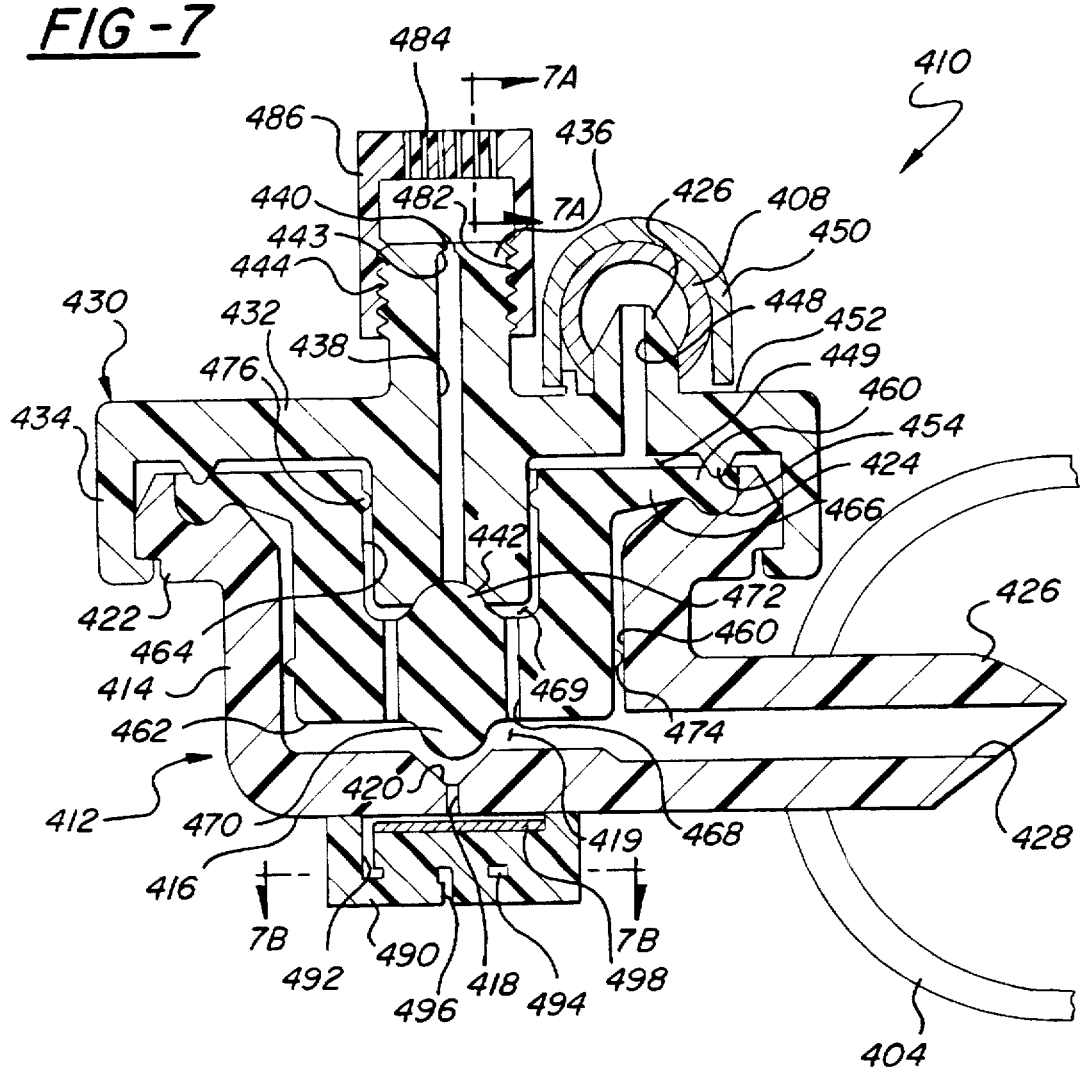
FIG-7
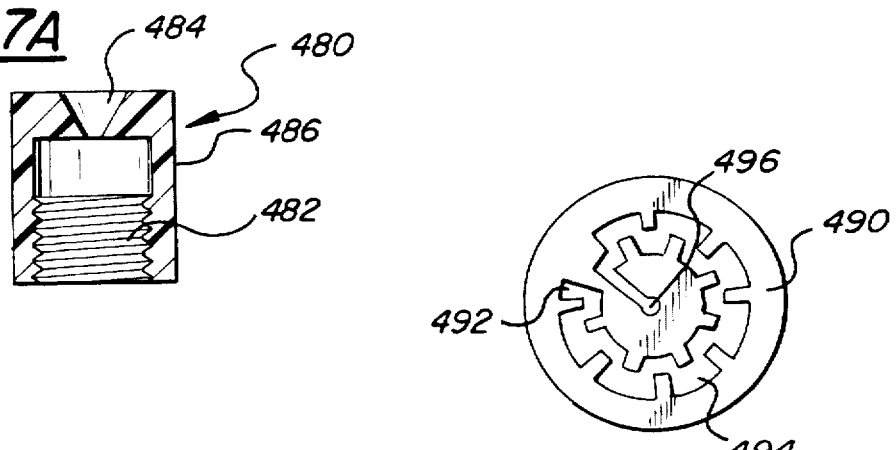
FIG-7A
FIG-7B

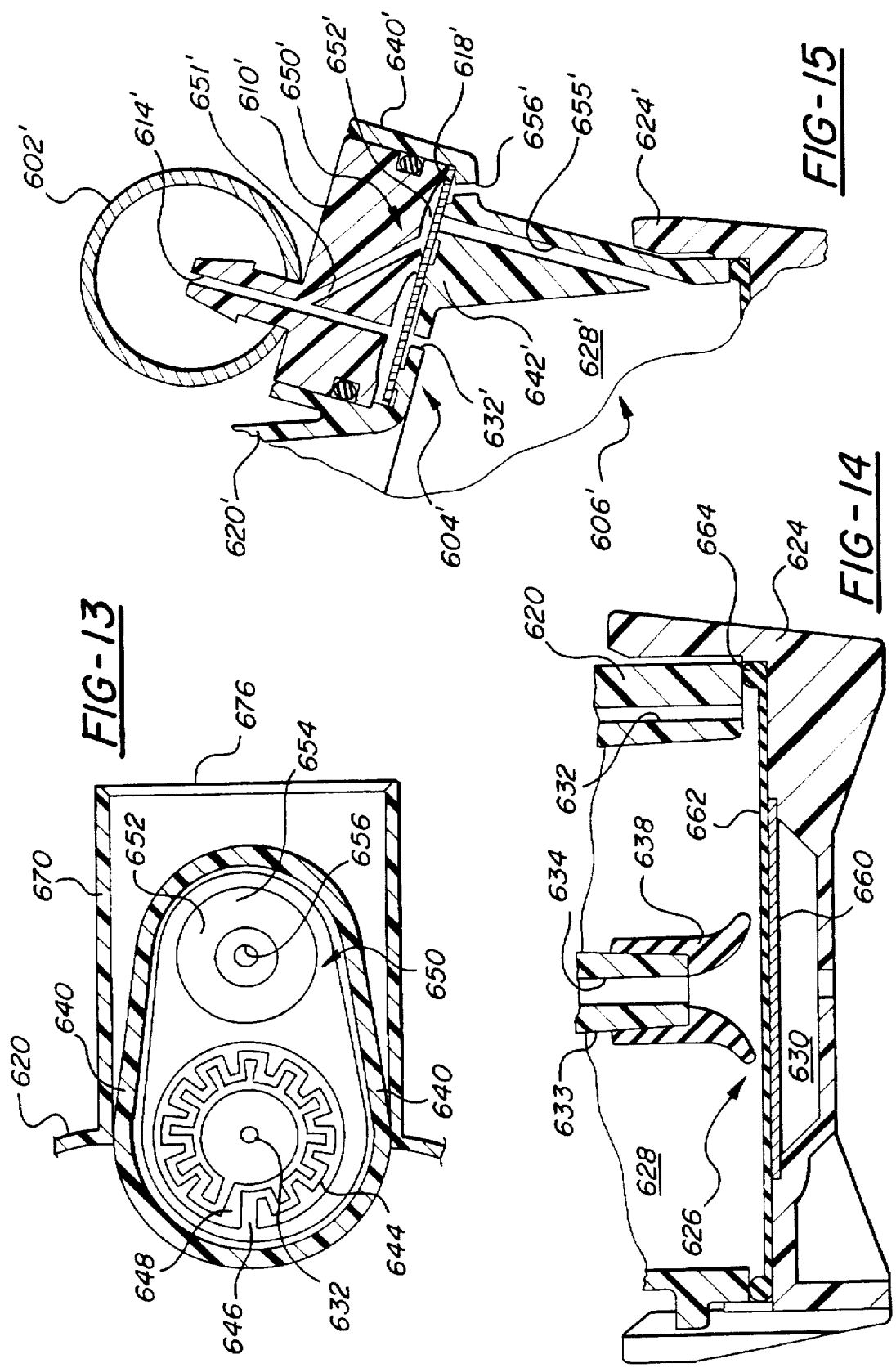

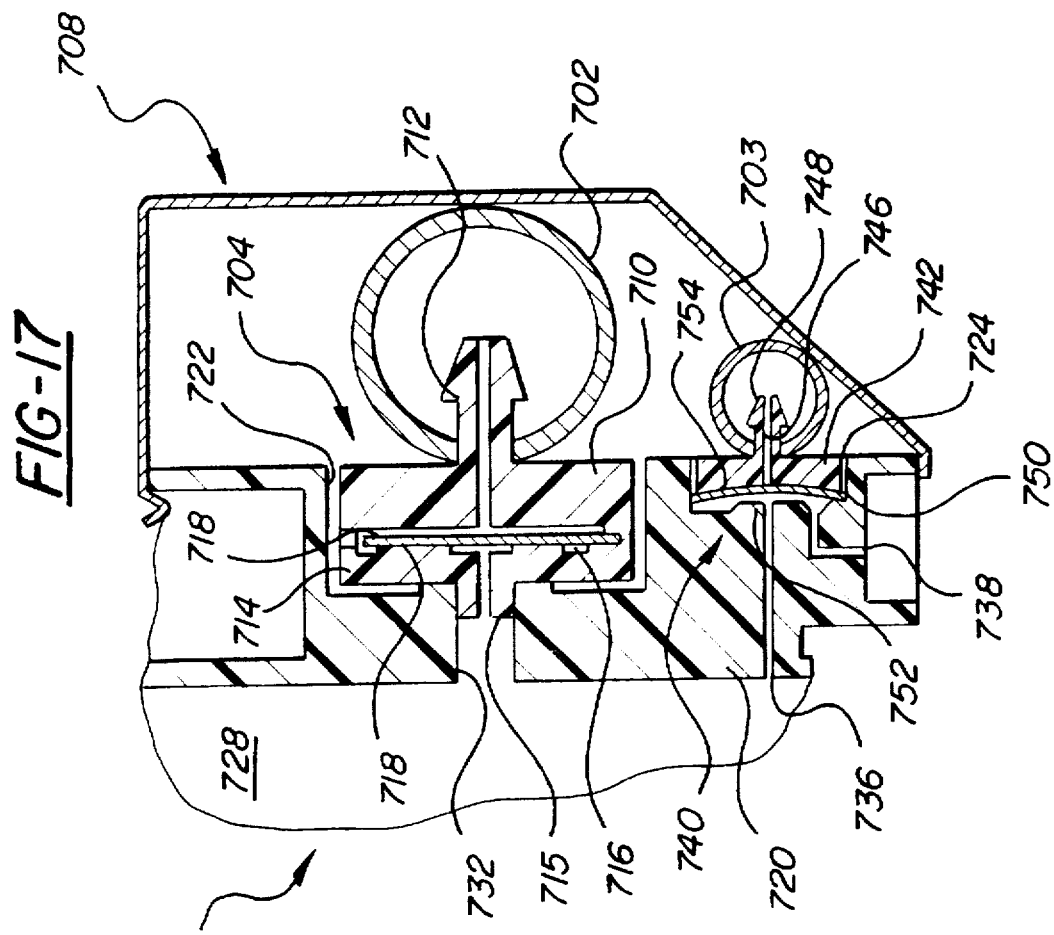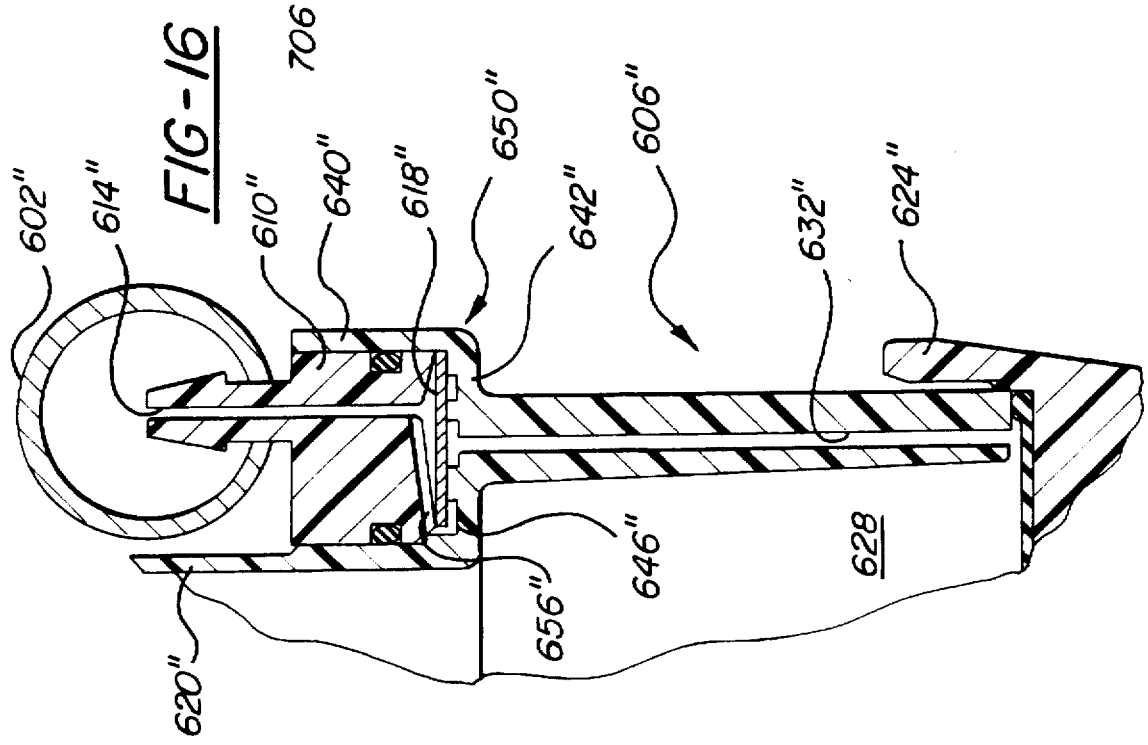

PULSED IRRIGATION CONTROL VALVE WITH PRESSURE RELIEF

CROSS-REFERENCE TO RELATED APPLICATION

This application is a continuation-in-part of application Ser. No. 08/214,813 filed Mar. 17, 1994 now U.S. Pat. No. 5,465,905 and entitled "Irrigation System With Multi-Functional Irrigation Control Valve."

BACKGROUND OF THE INVENTION

1. Field of the Invention

The present invention relates to an irrigation control valve and a micro-irrigation system having a liquid supply tube and a plurality of irrigation control valves, and more particularly to a pulsed irrigation control valve for converting a constant, low-volume flow rate input from the liquid supply tube into a pulsating, high-volume flow rate output.

2. Description of Related Art

In order to achieve maximum crop yield, careful monitoring and control of the growing environment must occur. For example, agricultural irrigation is used to temper climate conditions which are adverse to crop production, including watering the soil, protecting crops from frost damage, preventing the growth of mold and fungus, and applying chemicals, insecticides, pesticides and fertilizers to promote growth. These techniques are also used in animal husbandry to cool animals, such as livestock, and to provide pest control.

A variety of individual systems which provide localized climate control are known. For example, crops may be watered through surface, subsurface, sprinkler and drip irrigation systems. Surface, subsurface and sprinkler irrigation systems are inefficient means of watering since they provide moisture to the crops by irrigating the entire field area. Large quantities of water which are transported to and around the fields do not irrigate the crop directly but rather wet the entire field. A great deal of water and energy used to transport the water is wasted as a result of evaporation to the atmosphere or absorption into the soil. Thus, only a small portion of the water is actually utilized by the crop. Furthermore, the large pipelines and pumps needed to transport the vast quantities of water are expensive to purchase, construct and maintain.

Drip irrigation provides a method of continuously irrigating individual plants through small-diameter tubes and emitters. The advantage of drip systems is that water can be targeted directly at the crop to create localized high moisture areas without having to irrigate the remaining field area. The components of a drip irrigation system are much less expensive than surface, subsurface or sprinkler-type systems. As a result, drip irrigation systems are fairly common and, once installed, are efficient and fairly maintenance free. However, a significant drawback of drip irrigation systems is its inability to provide adequate frost protection for the crop.

A single frost during a growing season can severely decrease or destroy crop production and yield for an entire season. Thus, it is desirable to augment a drip irrigation system with frost protection ability. While a variety of frost protection mechanisms are known, such as smudge pots, tower fans, helicopters, and sprinklers, mist irrigation, which locally increases the humidity around the corp, provides the most promising means for integrating frost protection into a drip irrigation system. Much like the sprinkler system, the mist irrigation system coats the plants with water to protect them from frost damage. By targeting water in a spray directly at the crop, much less water is needed to coat the plant which reduces the amount of ice accumulation. In addition, mist irrigation also provides frost protection by transferring energy from the misted water to the air surrounding the crops. However, at the present mist irrigation systems cannot be readily integrated into drip irrigation systems. More specifically, the widely varying water supply pressures of drip irrigation systems make it difficult to incorporate a mist irrigation system. While a pressure regulation mechanism may be utilized to provide pressure compensated flow, the low-volume flow rate does not provide the necessary energy to discharge a desired spray pattern.

U.S. Pat. No. 5,465,905, which is commonly owned by the assignee of the present invention and which is expressly incorporated by reference herein, discloses a multi-functional irrigation control valve which selectively provides drip irrigation and mist irrigation from a single control valve. One preferred embodiment of this multi-functional irrigation control valve utilizes a disc spring disposed within an accumulation chamber to efficiently convert the constant, low-volume flow rate into a pulsed high-volume flow rate mist. While this preferred embodiment of the irrigation control valve could be readily modified to provide a mist-only irrigation control valve, it has been determined that prolonged inactivity of such a modified irrigation control valve can significantly affect its operation. More specifically, when water flow is stopped during the spray cycle, accumulated pressure cannot be relieved from the accumulation chamber. Subsequently, over a period of time, the resident air in the accumulation chamber will have a tendency to be absorbed into the fluid, thus decreasing the volume of air used to generate the pulsated high-volume flow rate mist. The absorption of air into the fluid has the effect of increasing the frequency of discharges and reducing the dwell between each spray discharge.

As highlighted by the above discussion, there is a need to provide an irrigation system that will perform the necessary climate control tasks of watering through drip irrigation and frost protection through mist irrigation. Accordingly, a mist irrigation system which can be readily integrated into an existing drip irrigation system would provide an economical system for adequately irrigating crops by reducing and conserving the water used. The system components should be simple in design, low in cost to purchase and maintain and readily adaptable to a variety of agricultural environments, including fields, orchards, greenhouses, atriums, livestock barns, etc. The irrigation system should be compatible with current drip irrigation technology so that it may be augmented into existing irrigation systems. The individual irrigation control valves should be easy to install and appropriately align so that irrigation is targeted at the desired location.

3. Objects of the Present Invention

It is one of the principal objects of the present invention to provide a novel mist irrigation control valve and irrigation system having a liquid supply tube which can be easily integrated into an existing drip irrigation system for providing a high-energy spray for frost protection and irrigation of crops.

Another object of the present invention is to provide an irrigation control valve whose mode of operation is not adversely affected by prolonged periods of non-use.

A further object of the present invention to provide an irrigation control valve for an irrigation system capable of effectively delivering pulsed spray irrigation while reducing the total volume of water emitted.

Yet another object of the present invention is to provide an improved drip/spray irrigation control valve which is responsive to a remotely generated control signal.

It is a further object of the present invention to provide an improved drip/spray irrigation control valve which is simple to manufacturer, install and maintain.

SUMMARY OF THE INVENTION

To achieve the foregoing and other objects, there is provided in accordance with the present invention, an irrigation control valve for use in an irrigation system having a liquid supply tube providing liquid to be emitted from the irrigation control valve. The irrigation control valve includes a control valve body having an inlet coupled to the liquid supply tube, and a mist port for providing mist irrigation from the irrigation control valve. In one preferred embodiment, the irrigation control valve includes an accumulation chamber having disc spring valve assembly covering a mist port for converting a constant, low-volume flow rate input into a pulsed, high-volume flow rate spray. The irrigation control valve further includes a pressure relief valve assembly integrated into the flow regulator assembly for bleeding the pressure within the accumulation chamber when the irrigation control valve is not operational.

In another preferred embodiment, the irrigation control valve is responsive to a static pressure signal provided by a separate control signal tube to selectively provide drip irrigation and mist irrigation. In this preferred embodiment, a mist valve assembly includes a diaphragm valve member interdisposed between an accumulation chamber and a drip port to reveal and conceal the drip port for providing drip irrigation and for bleeding the pressure within the accumulation chamber when the irrigation control valve is not operational. A drip valve assembly is interdisposed between the irrigation control valve and the mist port for alternately revealing and concealing the mist port in response to the fluid pressure the irrigation control valve during mist irrigation to provide intermittent or pulsating mist irrigation. The drip valve assembly further acts as a pressure relief valve assembly for bleeding the pressure within the accumulation chamber when the irrigation control valve is not operational.

The present invention also provides a self-aligning support bracket for appropriately aligning and fixturing irrigation control valves. The support bracket is intended to mount on a vertical post, such as a 2×2, metal stake or any other suitable post, and locate the irrigation control valves above ground level so that cultivation of the soil can be performed but below the foliage level so that drip irrigation reaches the ground unhindered. The support bracket further includes a tube retaining means for holding the supply tube and an irrigation control valve alignment means for appropriately aligning the irrigation control valve so that drip irrigation is emitted in a substantially downward direction and mist irrigation is targeted upward at the crop, such as a vine, for optimal frost damage protection.

BRIEF DESCRIPTION OF THE DRAWINGS

In order to appreciate the manner in which the above-recited and other advantages and objects of the invention are obtained, a more particular description of the invention will be rendered by reference to specific embodiments thereof which are illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 1 is a perspective of an irrigation system having a plurality of irrigation control valves with a water supply tube for alternately providing drip irrigation or mist irrigation in response to water supply pressure in an orchard environment;

FIG. 2 is a cross-section of a first preferred embodiment of the irrigation control valve shown in FIG. 1 wherein the displaceable structure includes dual reciprocating pistons disposed within the control valve body;

FIG. 2A is a cross section of a piston head for irrigation control valve shown in FIGS. 2 & 5;

FIG. 6 is a cross-section of a third embodiment of an irrigation control valve of the present invention having water and air supply tubes wherein the displaceable structure is a single reciprocating piston responsive to air pressure for alternately providing mist irrigation and drip irrigation;

FIG. 6A is a cross-section through the mist port of the irrigation control valve shown in FIG. 6 illustrating the converging-diverging nozzle geometry and air passageways;

FIG. 6B is a cross-section through the control valve body of irrigation control valve shown in FIG. 6 illustrating the internal passageways which provide fluid communication to the mist port;

FIG. 7 is a cross-section of a fourth preferred embodiment of an irrigation control valve of the present invention having a water supply tube and a static air pressure control line wherein the displaceable structure is a piston-diaphragm assembly responsive to the static air pressure in the control line;

FIG. 7A is a cross-section of the threaded diverter for directing mist emitted from the irrigation control valve shown in FIG. 7;

FIG. 7B is a cross-section of a suitable flow regulator utilized on an irrigation control valve to compensate for fluid pressure variations in the water supply line;

FIG. 13 is a cross-section of the irrigation control valve shown in FIG. 12 illustrating the integrated flow regulator assembly and pressure relief valve assembly;

FIG. 14 is a cross-section of the diaphragm assembly of the irrigation control valve shown in FIG. 12 illustrating a skirted annular seal disposed on the mist passageway for accommodating small linear displacements of the mist valve assembly;

FIG. 15 is a partial cross-sectional view illustrating a first alternate embodiment of the integrated flow regulator assembly and pressure relief valve assembly for the irrigation control valve shown in FIG. 12;

FIG. 16 is a partial cross-sectional view illustrating a second alternate embodiment of the integrated flow regulator assembly and pressure relief valve assembly for the irrigation control valve shown in FIG. 12, whereby working fluid is discharged back into the input supply line; and FIG. 17 is a partial cross-sectional view of a seventh preferred embodiment of an irrigation control valve of the present invention which selectively provides mist irrigation or drip irrigation in response to a static pressure provided in a control line.

DESCRIPTION OF THE PREFERRED EMBODIMENT

Figure 3:
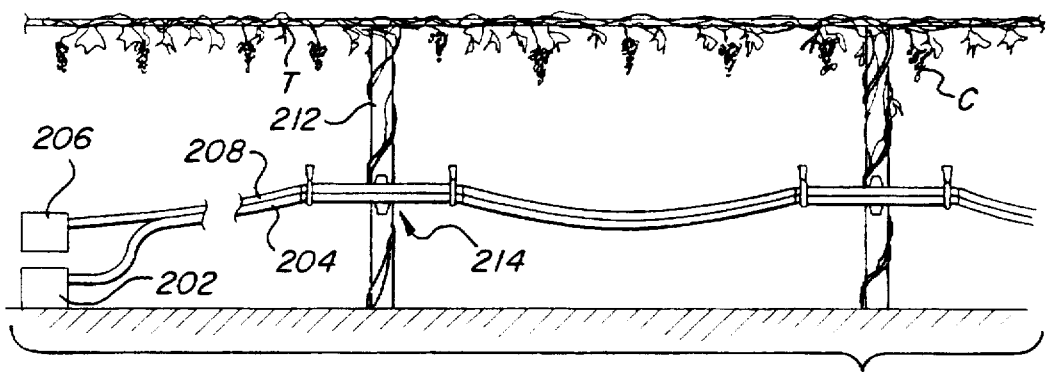
FIG. 3 is an elevation of an irrigation system having a plurality of irrigation control valves with water and air supply tubes for alternately providing drip irrigation or mist irrigation in response to water supply pressure in a viticultural environment, the irrigation control valves having air assist to facilitate the atomization of water during mist irrigation.

FIG. 1 illustrates a first embodiment of the present invention having a dual reciprocating piston assembly for selectively providing drip and mist irrigation in an agricultural environment. Irrigation system 110 includes irrigation control valve 130 mounted on support post 112. Water supply 102 supplies a volumetric flow of water to water supply tube 104 at a given pressure. A plurality of irrigation control valves 130 are selectively positioned along water supply tube 104 to provide irrigation for crop C illustrated in FIG. 1 as fruit trees.

Individual irrigation control valves 130 are snapped into holes punctured in water supply tube 104 using a piercing tool or other similar device. Irrigation control valve 130 couples with water supply tube 104 to provide a water tight seal. When irrigation control valve 130 is removed, a snap cap (not shown) may be inserted into the existing hole to seal water supply tube 104 and prevent leakage. In this manner irrigation system 110 may be used for many years and adapted to varying planting needs.

Water supply 102 is a well/pump combination or any other similar means of providing a water source. Furthermore, water supply 102 incorporates a means for regulating the pressure of the water into water supply tube 104 such as a pressure control valve. An automated controller 101 may also be incorporated into irrigation system 110 to filter, measure and calculate application of water and/or other fluids such as chemicals for fertilization and pest control. Controller 101 may be operated manually or assisted by meteorological, soil quality or Ph measuring instrumentation. Controller 101 may also operate a single irrigation system 110 or multiple irrigation systems using shutoff valves and manifolds coupled to the water supply tubes. These manifolds and shutoff valves may be customized to adapt for varying central water pressure. In this regard, the present invention is such that it can be readily adapted to a standard drip irrigation system currently available and well-known in the art.

Referring to FIG. 2, irrigation control valve 130 includes control valve body 132 having an inlet passageway 164, a drip port 140 and mist port 144. Water supply tube 104 is coupled to irrigation control valve 130 via inlet passageway 164 to provide fluid communication therebetween. Orientation fin 120 extending from control valve body 132 surrounds the outer circumference of water supply tube 104 and attaches to support post 112 to locate and appropriately position irrigation system 110 relative to crop C. Orientation fin 120 includes upper finger 122 and lower finger 124 extending therefrom to surround water supply tube 104. Support post 112 includes slot 114 for engaging upper and lower fingers 122 and 124. Barb 126 and 128 extend from upper and lower finger 122 and 124 respectively, to engage support post 112, thereby preventing dislocation of the irrigation control valve 130 from support post 112. Support post 112 locates water supply tube 104 above ground level so that the soil may be cultivated and below the foliage level of crop C so that drip irrigation water reaches the ground unhindered.

Control valve body 132 includes cylindrical housing 134 which has bore 136 extending down through the longitudinal axis thereof. End cap 138 is positioned at the bottom of, and closes off cylindrical housing 134. Drip port 140 extends through end cap 138. Similarly, end cap 142 is located at the top of, and closes off cylindrical housing 134. Mist port 144 extends through end cap 142 which is tapered upwardly to form converging nozzle 143 from bore 136 to mist port 144. Interior wall 146 is disposed within bore 136 of cylindrical housing 134 and partitions bore 136 into lower chamber 150 and upper chamber 152. Port 148 extends through interior wall 146 along the central longitudinal axis of cylindrical housing 134 to provide fluid communication between lower chamber 150 and upper chamber 152. Nipple 162, disposed between cylindrical housing 134 and water supply tube 104, has inlet passageway 164 extending therethrough to provide fluid communication between water supply tube 104 and lower chamber 150.

In the embodiment shown in FIG. 2, the displaceable structure of irrigation control valve 130 includes drip piston assembly 170 and mist piston assembly 180 which directs water flow to either the mist port 144 or drip port 140 in response to the fluid pressure in water supply tube 104. Drip piston assembly 170, disposed within lower chamber 150, includes piston 172 capable of reciprocating along the longitudinal axis of cylindrical housing 134, spring 176 upwardly biasing piston 172 in lower chamber 150 and seal 178 adjacent to end cap 138 and circumscribing drip port 140. Spring 176 is disposed between end cap 138 and piston 172 and urges the piston away from seal 178, thereby creating a normally open valve, i.e. when fluid pressure is below a target pressure, fluid flow is allowed to occur through drip piston assembly 170.

Mist piston assembly 180, disposed within upper chamber 152, includes piston 182 which is capable of reciprocating along the longitudinal axis of upper chamber 152, spring 186 disposed between end cap 142 and piston 182 downwardly biasing piston 182, seal 188 located within upper chamber 152 adjacent to interior wall 146 and circumscribing port 148. Spring 186 is disposed between end cap 142 and piston 182 causing piston 182 to be urged against and engage seal 188, thus creating a normally closed valve. When the fluid pressure is below the mist activation pressure, mist piston assembly 180 prevents fluid flow through upper chamber 152 and out of mist port 144.

Referring to FIG. 2A, piston 172 includes piston head 173 having a diameter slightly less than bore 136 to enable pistons 172 to reciprocate therein and piston body 175 having an outer diameter slightly less than the interior diameter of spring 176 such that piston body 175 fits within spring 176. Bore 136 contains grooves 174 and 184 molded in lower chamber 150 and upper chamber 152, respectively. Grooves 174 and 184 are tapered towards drip port 140 and mist port 144 to provide flow regulation as pistons 172 and 182 reciprocate in bore 136.

Control valve body 132 may be manufactured as two thermoplastic injection molded body halves. The drip piston assembly 170 and mist piston assembly 180 may be manufactured as single elastomeric injection molded pistons. The piston may be molded of a flexible material, i.e. thermoplastic elastomer, TPO or an equivalent plastic such that piston 172 and 182 will change shape in certain desired areas with varying water pressure and also provide adequate seal against the end caps making seals 178 and 188 redundant and thus unnecessary. Pistons 172 and 182 may also be molded by a process which allows materials having different properties, i.e. modulus and durometer, to be molded together as one piece to attain the desired functionality. The various ports and passageways may be machined in a second manufacturing process or may be integrally molded precision ports and passageways. Piston assemblies 170 and 180 are sealed inside the control valve body 132 by a vibration welding, spin welding or adhesive bonding to form irrigation control valve 130.

The operation of the irrigation control valve 130 will now be described with particular reference to the structures described above. Water is pumped from water supply 102 through water supply tube 104 at a given pressure into lower chamber 150 of irrigation control valve 130 via inlet passageway 164. As water accumulates in the upper portion of lower chamber 150 it flows through groove 174 into the lower portion of lower chamber 150 and is emitted out drip port 140. The water pressure in lower chamber 150 acts on piston head 173 to generate a downward force causing piston 172 to be displaced downward towards end cap 138. This is reacted by the upward biasing force imposed on piston 172 by spring 176. As the fluid pressure in water supply tube 104 and lower chamber 150 increase, spring 176 is further compressed by piston 172 until spring 176 is fully compressed and piston body 175 engages seal 178. At this point piston body 175 and seal 178 cooperate to effectively seal lower chamber 150 from drip port 140 and prevent fluid communication therethrough.

Figure 5:
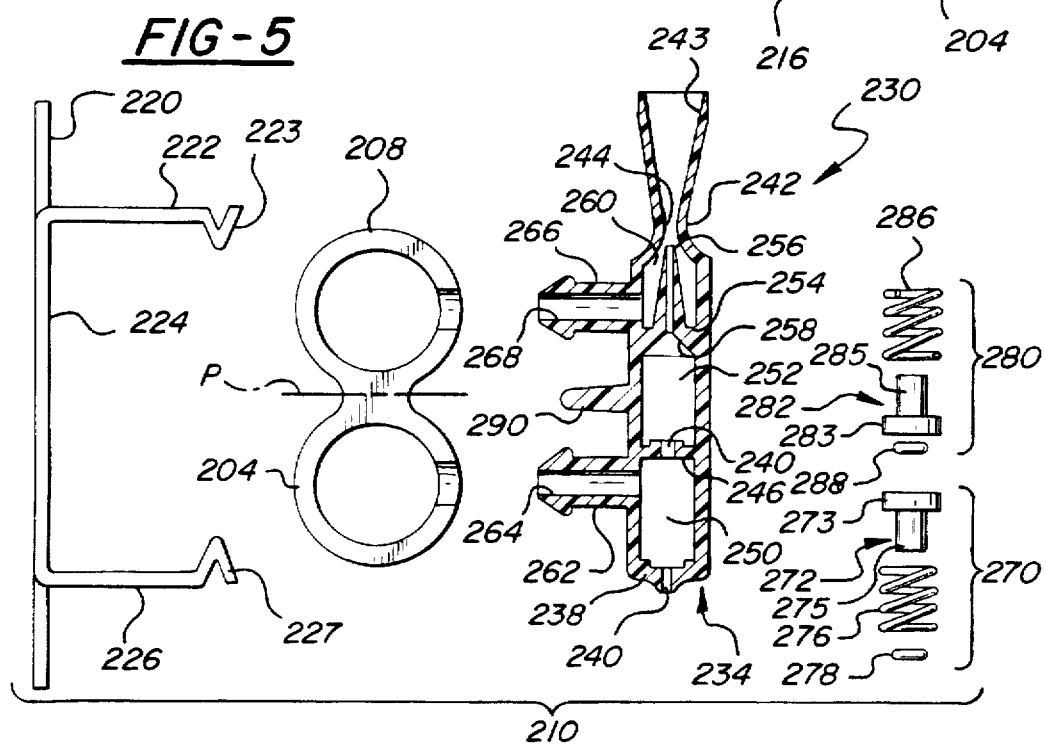
FIG. 5 is an exploded cross section of a second preferred embodiment of the irrigation control valve and support bracket shown in FIG. 4 wherein the displaceable structure is a dual reciprocating piston.

Water within lower chamber 150 is also communicated into port 148. Seal 188 cooperates with piston head 183 to prevent fluid from flowing into upper chamber 152 and out through mist port 144. The preload in spring 186 is sufficient to urge piston 182 onto seal 188 when the fluid pressure is below the desired mist activation pressure. Once the water pressure in port 148 exceeds this pressure, the force acting on piston body 185 is sufficient to overcome the preload of spring 186 and disengage piston 182 from seal 188. This displacement provides fluid communication into upper chamber 152 and reveals groove 184 to enable fluid flow out of mist port 144. The velocity of the water flowing out of upper chamber 152 increases as it flows through converging nozzle 143 causing the water to be emitted as a fine mist or spray, i.e., vaporized through mist port 144. The nozzle geometry of converging nozzle 143 and mist port 144 has direct impact on the shape, direction and quality (droplet size) of the spray pattern. This geometry can be designed for specific targeting of crops for various applications based on requirements.

An exemplary mode of operation would be allow drip irrigation in a water pressure range from 0 to 20 pounds per square inch (p.s.i.). Thus, the spring constant for spring 176 should be computed such that the force created by 20 p.s.i. acting on piston head 173 is sufficient to fully compress spring 176. Mist irrigation would be provided when the fluid pressure in water supply tube 104 is greater than 40 p.s.i. To ensure control over the method of water delivery, there is a relative safety zone from 20 to 40 p.s.i. where neither drip irrigation or mist irrigation occurs. While these numbers are exemplary of typical field pressure, one skilled in the art would readily recognize that it is the relative pressure ranges and not the absolute pressure valves which are most important to the proper selection of drip and mist irrigation.

FIG. 3 illustrates a second preferred embodiment of the present invention in a viticultural environment. Like reference numerals in the two hundred range are employed to indicate corresponding parts referenced in FIGS. 1 and 2. Irrigation system 210 includes irrigation control valves 230 coupled with water supply tube 204 and air supply tube 208. Water supply 202 supplies a volumetric flow to water to water supply tube 204 at a given pressure, while air supply tube 206 supplies a volumetric flow of air to air supply tube 208 at a given pressure. Irrigation system 210 is positively positioned within support bracket 214 which is attached to post 212 of trellis T. Crop C is trained to grow along trellis T such that irrigation system 210 may provide drip irrigation downward to the roots of crop C or mist irrigation upward towards the branches and buds of crop C.

Referring to FIGS. 4 and 5, support bracket 214 is shown in greater detail and includes a right retaining means 216 and left retaining means 218 separated by an attachment flange 220. The right and left retaining means 216, 218 are substantially similar in cross-section and include top portion 222, back portion 224 and bottom portion 226 which forms a C-shaped channel for capturing water supply tube 204 and air supply tube 208. Edge 223 of top 222 and edge 227 of bottom 226 have a generally V-shaped cross-section for securing water supply tube 204 and air supply tube 208 within channels 216, 218. Irrigation control valve 230 can be located along support bracket 214 and coupled to water supply tubes 204 and air supply tube 208. Orientation prong 290 extends from cylindrical housing 234 and cooperates with supply tubes 204 and 208 to appropriately align irrigation control valve 230. In addition, retaining means 216, 218 can be employed engaged and appropriately align irrigation control valve 230. Flange 220 extends from back 224 of bracket 214. This flange may be cut out of a section of top 222 and bottom 226 and formed parallel to back 224. While flange 220 is provided with holes for attaching support bracket 214 to post 212, other means of attachment may be used. When irrigation system 210 including irrigation control valve 230 coupled to supply tubes 204 and 208 is placed in support bracket 214, irrigation control valves 230 are appropriately aligned to allow drip irrigation downward and mist irrigation upward.

Water supply tube 204 and air supply tube 208, as illustrated in FIGS. 3–5, are manufactured as a single component having water supply tube 204 and an air supply tube 208 formed therein. As shown in FIG. 5, water supply tube 204 and air supply tube 208 are circular in cross-section and are tangentially joined at the outer circumference thereof. In this configuration, supply tubes 204 and 208 may be coextruded from polyvinyl chloride plastics as a single component. Further, it is preferred to design this co-extruded hose so that water supply line 204 can be separated from air supply tube 208 along a parting line P shown in FIG. 5, while still maintaining the continuity and integrity of each supply line.

Referring now to FIG. 5 irrigation control valve 230, is substantially similar to irrigation control valve 130 illustrated in FIGS. 1–3, with the additional feature of providing pneumatic assistance to irrigation control valve 230. The pneumatic assistance is used to facilitate atomization during mist irrigation and provide better dispersion of misted water by creating critical fluid flow through nozzle 243 downstream of the interior port 256. In this embodiment, the components and operation of the irrigation control valve for directing water to the drip port 240 or interior port 256 are identical to the embodiment described above and illustrated in FIGS. 1–2. Accordingly, only the distinctions between the first and second embodiment will be hereafter described.

Cylindrical housing 234 is partitioned into first 250, second 252 and third 260 chamber. Interior wall 246 separates first chamber 250 from second chamber 252 as previously described, while interior wall 254 separates second chamber 252 from third chamber 260. Interior port 256 provides fluid communication from second chamber 252 into third chamber 260. End cap 242 is located at the top of, and closes off cylindrical housing 234. End cap 242 is tapered such that a converging-diverging nozzle 243 extends from third chamber 260 out through mist port 244. Nipple 266 is interposed between air supply tube 208 and cylindrical housing 234 and provides fluid communication between air supply tube 208 and third chamber 260 via inlet passageway 268.

The operation of irrigation system 210 is similar to the operation of the irrigation system 110 described above, with the exception that volumetric air flow may be provided through air supply tube 208 during mist irrigation to facilitate atomization of the water. In this mode, drip valve 270 and mist valve 280 direct water from water supply tube 204 through inlet passageway 264 and port 248 into second chamber 252 as previously described. In addition, air flow is provided from air supply tube 208 through inlet passageway 268 into third chamber 260 where the geometry of converging-diverging nozzle 243 accelerates the air flow to sonic velocities and out of mist port 244. A pressure differential is created between second chamber 252 and third chamber 260 and water communicated to port 256 is drawn into the sonic air flow created by converging/diverging nozzle 243. The acceleration of water flow shears mist into super fine droplets to create a water vapor or fog which is emitted from mist port 244.

FIG. 6 illustrates a third embodiment of irrigation control valve 330 having a single reciprocating piston assembly for selecting drip or mist irrigation. Like reference numerals in the three hundred range are employed to indicate similar components to the previously described embodiments in FIGS. 1–5. Referring to FIG. 6, control valve body 332 has a cylindrical housing 334 having bore 336 along its central longitudinal axis. End cap 338 is positioned to the right of, and closes off cylindrical housing 334. Nipple 362 extends from end cap 338 to couple with water supply tube 304. Passageway 364 provides fluid communication between water supply tube 304 and bore 336. Similarly, end cap 342 is located to the left of, and closes off cylindrical housing 334. Nipple 366 extends from end cap 342 to couple with air supply tube 308 and provide fluid communication between air supply tube 308 and bore 336 via passageway 368.

Orientation fin 320 extends longitudinally along irrigation control valve 330. Arcuate edges 322 and 324 are formed in the left and right portion of orientation fin 320 and engage water supply tube 304 and air supply tube 308 to appropriately position irrigation control valve 330. Flow control passageway 341 is molded into and extends through cylindrical housing 334 and orientation fin 320 in a labyrinthine manner to drip port 340, thus providing fluid communication between bore 336 and drip port 340. Venturi 345 and converging-diverging nozzle 343 extend upwardly from cylindrical housing 334 to provide fluid communication out of irrigation control valve 330.

Piston assembly 370 is responsive to the fluid pressures in water supply tube 304 and air supply tube 308 to direct fluid from bore 336 to drip port 340 or mist port 344 and includes piston 372 disposed within bore 336 having piston head 374, piston skirt 378 and piston bottom 380. Blind bore 375 partially extends through piston 370. Chamber 350 is defined by piston head 374 and blind bore 375, bore 336 and end cap 338. Passageway 364 extends through end cap 338 to provide fluid communication between water supply tube 304 and chamber 350. Chamber 352 is defined by piston bottom 380, bore 336 and end cap 342 and is in fluid communication with passageway 368. Referring to FIG. 6A, piston stop 390 including radially extending ribs 392 is disposed within chamber 352. Passageway 368 extends through end cap 342 and the central portion of radial ribs 392 to provide fluid communication between air supply tube 308 and chamber 352. Piston stop 390 prevents piston assembly 370 from completely reciprocating within bore 336 and engaging end cap 342, thus preventing air flow into left chamber 352. Mist passageway 347 provides fluid communication from bore 336 through control valve body 332 to mist port 344 as can best be seen in FIGS. 6A and 6B.

Referring again to FIGS. 6 and 6B, piston assembly 370 includes piston head seal 382 disposed on piston head 374 and circumscribing blind bore 375, drip passageway seal 384 disposed on piston skirt 378 adjacent piston head 375 and mist passageway seal 386 disposed on piston skirt 378 adjacent piston bottom 380. Piston assembly 370 further includes piston port 376 extending radially through piston 372 from blind bore 375 through piston skirt 378. Piston port 376 provides fluid communication from chamber 350 and blind bore 375 to mist passageway 347.

The operation of irrigation control valve 330 will now be described with particular reference to the structures described above. Piston 372 reciprocates within bore 336 to alternately provide fluid communication from water supply tube 304 to drip port 340 or mist port 344 in response to the fluid pressure in water supply tube 304 and air supply tube 308. During drip irrigation mode water is supplied through water supply tube 304 at a given pressure while no air is supplied through air supply tube 308. Thus, the water from water supply tube 304 is communicated through passageway 364 into chamber 350 and acts upon piston head 374. The resultant force pushes piston 372 leftward until it engages piston stop 390. This displacement reveals flow control passageway 341 and allows fluid communication from chamber 350 through flow control passageway 341 and out through drip port 340. The labyrinthine design of flow control passageway 341 provides flow regulation from chamber 350 to drip port 340 such that a calibrated amount of water is emitted. Water from chamber 350 is also communicated through piston port 376 to piston skirt 378. However, mist passageway seals 386 engage bore 336 to prohibit further flow through piston port 376 during drip irrigation.

When mist irrigation is desired, air supply tube 308 is pressurized causing air flow through passageway 368 and into chamber 352. Air pressure within chamber 352 acts on piston bottom 380 to urge piston 372 rightwardly. As the force acting on piston bottom 380 becomes greater than the force acting on piston head 374, piston 372 is urged rightwardly. When piston 372 reaches its rightwardmost position, piston head seal 382 engages end cap 338, thereby restricting fluid communication in right chamber 350 to blind bore 375. A lower air pressure is now required to maintain mist irrigation as a result of the decreased area of piston head 374 on which the water pressure acts.

Flow control passageway seal 384 conceals drip passageway 341 to prevent fluid communication therethrough. Piston port 376 is now aligned with mist passageway 347 to provide fluid communication from water supply tube 304 to mist port 344 via passageway 364, blind bore 375, piston port 376, and mist passageway 347. In chamber 352, volumetric air flow is provided from air supply tube 308 through venturi 345 into the atmosphere via converging/diverging nozzle 343. Because of the geometry of converging/diverging nozzle 343 and the pressure differential between chamber 352 and the atmosphere, sonic air flow is created at venturi 345. This air flow condition creates a low pressure area in venturi 345 which draws water through mist port 344, shears the water into fine droplets and accelerates the droplets out converging/diverging nozzle 343 at high velocities to create a superfine mist.

FIGS. 7, 7A, 7B and 8 illustrate a fourth embodiment of the present invention which incorporates a displaceable piston-diaphragm assembly for selecting drip or mist irrigation. Irrigation control valve 410 includes control valve body 412 coupled to water supply tube 404 and having drip port 418 therein. Piston-diaphragm assembly 460 is disposed within control valve body 412 to direct fluid flow for mist irrigation or drip irrigation in response to a control signal. Control valve cap 430 covers control valve body 412 and encloses and secures piston-diaphragm assembly 460 within control valve body 412. Control valve cap 430 further includes mist port 440 for providing mist irrigation from irrigation control valve 410 and nipple 426 for providing fluid communication from air supply line 408 through control valve cap 430. In this embodiment, working fluid, i.e. water, is communicated from water supply line 408 into control valve body 412 and is directed to drip port 418 or mist port 440 based on the pressure state of a control fluid, i.e. air, provided in air supply line 408 which biases piston-diaphragm assembly 460. Unlike the previous embodiments of the present invention, air supply line 408 does not require volumetric flow but is only required to hold a pressure which biases piston-diaphragm assembly 460 as further described in detail below.

Referring to FIG. 7, control valve body 412 is generally cup-shaped having cylindrical wall 414 extending upwardly to rim 422. Rim 422 of control valve body 412 has an annular diaphragm retaining channel 424 formed therein. Control valve bottom 416 closes off cylindrical wall 414 to define chamber 415. Control valve bottom 416 has a tapered lower seal seat 420 formed therein which extends downward to drip port 418 for providing fluid communication from chamber 415. Nipple 426 is interdisposed between control valve body 412 and water supply tube 404 and provides fluid communication between water supply tube 404 and chamber 415 via passageway 428.

Control valve cap 430 includes top 432 which substantially covers chamber 415 of control valve body 412. Annular skirt 432 extends downward from top 432 to engage rim 422 and securely position control valve cap 430 on to control valve body 412. Control valve cap 430 further includes diaphragm sealing and retaining rib 454 located on top 432 inboard of annular skirt 434. Nipple 446 extends upwardly through top 432 and pierces air supply tube 408. Control fluid passageway 448 extends through nipple 446 to provide fluid communication from air supply tube 408 into chamber 415. Yoke 450 is pivotally attached at pivot point 452 to top 432 and rotates to engage and securely position air supply tube 408 onto nipple 446. Yoke clip 454 engages and locks yoke 450 in a closed position. Conduit 436 extends through top 432 and includes outlet passageway 438 to provide fluid communication between chamber 415 and mist port 440. Tapered upper seal seat 442 is formed in conduit 436 opposite mist port 440. The upper portion of conduit 436 has external threads 444 to threadedly engage diverter 480.

As illustrated in FIGS. 7 and 7A, diverter 480 includes threaded collar 482 for positioning diverter 480 on control valve cap 430. Diverter uprights 486 extend upwardly from threaded collar 482 and are connected above conduit 436 by triangular member 484. Diverter 480 illustrated in FIG. 7A divides mist emitted from mist port 440 and laterally redirects the mist to the right or left. One skilled in the art would readily recognize that a variety of diverter geometries could be incorporated into diverter 480 to achieve the desired mist irrigation pattern for a given crop or diverter 480 could be molded into irrigation control valve 410, without deviating from the scope of the invention.

Referring again to FIG. 7, piston-diaphragm assembly 460 is disposed within chamber 415 and includes piston 462 having blind bore 464 extending partially therethrough and diaphragm 466 extending outwardly from the upper portion of piston 462. Piston-diaphragm assembly 460 is positioned within control valve body 412 such that the outer portion of diaphragm 466 sits within diaphragm retaining channel 424. Diaphragm retaining rib 454 of control valve cap 430 engages the upper surface of diaphragm 466 and cooperates with diaphragm retaining channel 424 to secure piston-diaphragm assembly 460 within chamber 415. The elastic characteristics of diaphragm 466 acts to bias piston-diaphragm assembly 460 in an upward direction.

Piston-diaphragm assembly 460 divides chamber 415 into drip chamber 419, control fluid chamber 449 and mist chamber 469. Control fluid chamber 449 is defined by control valve cap 430, diaphragm retaining rib 456, diaphragm 466 and conduit 436 such that air from air supply tube 408 is in fluid communication with control fluid chamber 449 via control fluid passageway 448. Mist chamber 469 is defined on three sides by piston 462 and by conduit 436. Outlet passageway 438 provides fluid communication between mist chamber 469 and mist port 440. Drip chamber 419 is defined by control valve body 412 and piston 462. Inlet passageway 428 provides communication between water supply tube 404 and drip chamber 419. Drip port 418 provides fluid communication from drip chamber 419 out of control valve body 412. Diaphragm passageway 468 provides fluid communication between drip chamber 419 and mist chamber 469.

Piston-diaphragm assembly 460 incorporates a plurality of seals to prevent leakage between the air in control fluid chamber 449 and the water in mist chamber 469 and drip chamber 419. In addition, seals are incorporated on piston-diaphragm assembly 460 to expose and conceal drip port 418 and outlet passageway 438. Control valve cap seal 476 is disposed within blind bore 464 to prevent fluid communication between control fluid chamber 449 and mist chamber 469. Similarly, control valve body seal 474 is disposed about the outer surface of piston 462 and seals off drip chamber 419. Drip port seal 470 is disposed on the bottom of piston 462 and capable of engaging lower seal seat 420 to prevent fluid flow through drip port 418 when irrigation control valve 410 is in mist irrigation mode. Mist port seal 472 is disposed within blind bore 464 and capable of engaging upper seal seat 442 to prevent fluid communication from mist chamber 469 into outlet passageway 438 when irrigation control valve 410 is in drip irrigation mode.

Irrigation control valve 410 may also include flow regulator 490 disposed on control valve bottom 416 and in fluid communication with drip port 418. Flow regulator 490 provides a means for regulating the pressure and flow of water. Referring to FIG. 7B, flow regulator 490 includes flow regulator inlet 492 which is in fluid communication with drip port 418. Labyrinthine flow control passageway 494 provides an irregular path for fluid emitted from drip port 418. Flow regulator 490 further includes elastomeric diaphragm 498 which flexes in response to the pressure of the fluid in flow regulator 490 to constrict labyrinthine flow control passageway 494, thereby stabilizing the flow of the fluid in a manner well known in the art. Flow regulator outlet 496 is located at the end of flow control passageway 494 and allows water to be emitted from irrigation control valve 410.

The operation of irrigation control valve 410 will now be described with particular reference to the structures described above. During drip irrigation mode, a volumetric flow of water is provided in water supply tube 404 at a given pressure which communicated into drip chamber 419 via inlet passageway 428. Water which accumulates in drip chamber 419 flows through drip port 418 into flow regulator 490 where it is emitted out flows regulator outlet 496. Water in drip chamber 419 also flow through working fluid passageway 468 into mist chamber 469. However, the force generated by water in drip chamber 419 acting on the bottom of piston 462 urges piston-diaphragm assembly 460 upwardly such that mist port seal 472 engages upper seal seat 442 to prevent fluid communication through outlet passageway 428 and mist port 440.

When mist irrigation from irrigation control valve 410 is desired, air supply tube 408 is pressurized with a non-volumetric flow of air (an air charge) to increase the static pressure in control fluid chamber 449. A sufficient control pressure is applied into control fluid chamber 449 and acts upon diaphragm 466 to overcome the biasing force and the forces acting on the bottom of piston 462 resulting from the water pressure in drip chamber 419. Once this control force overcomes the working fluid force, piston-diaphragm valve 460 displaces downwardly causing drip port seal 470 to engage lower seal seat 420 and conceal drip port 418. Simultaneously, mist port seal 472 exposes outlet passageway 438 allowing water to flow from mist chamber through outlet passageway 438 and to be emitted from mist port 440. The converging nozzle 443 at mist port 440 accelerates the water flowing therethrough to create a fine mist. This mist may impinge on triangular member 484 and be appropriately directed towards the crop.

When drip irrigation is desired from irrigation control valve 410, the static pressure in control supply tube is released causing piston-diaphragm assembly 460 to return to its upwardly biased position. Mist port seal 472 conceals outlet passageway 438 and drip port seal 470 reveals drip port 418 allowing water to drip from control valve body 412.

FIG. 11 schematically represents and FIG. 8 illustrates a fifth embodiment of the present invention wherein water is supplied by water supply tube 510 to irrigation control valve 500 including control valve body 520 for alternately providing drip irrigation from drip port 526 and mist irrigation from mist port 528 in response to a control signal provided by air supply tube 570 which actuates first valve assembly 560 for alternately selecting mist irrigation or drip irrigation. Flow control regulator 550 is interdisposed between water supply tube 510 and control valve body 520 for stabilizing the flow rate of water provided thereto. Control valve body 520 further includes a second valve assembly 580 for intermittently emitting mist when irrigation control valve 500 is in a mist irrigation mode. Thus, in this embodiment, irrigation control valve 500 provides drip irrigation when air supply tube 570 is in a low control state and provides pulsating mist irrigation when air supply tube 570 is in a high control state.

Referring to FIGS. 8 and 11, water supply tube 510 transports water at a given water pressure to irrigation control valve 500. Irrigation control valve 500 includes control valve body 520 having a chamber 522 and a first passageway 524 in fluid communication between water supply tube 510 and chamber 522. Flow regulator 550 is interdisposed between first passageway 524 and chamber 522 for regulating the water flow from water supply tube 510 into chamber 522, and thus controlling and stabilizing the flow rate of the water supply communicated into chamber 522. Control valve body 520 further includes drip port 526 and mist port 528 in fluid communication with chamber 522 for emitting water from irrigation control valve 500 in the appropriate irrigation mode. First valve assembly 560, interdisposed between chamber 522 and drip port 526, enables a user to alternately select the irrigation mode of operation for irrigation control valve 500. First valve assembly 560 is controlled by air supply tube 570 for alternately selecting this mode. Second valve assembly 580, interdisposed between chamber 522 and mist port 528, acts as a pressure relief valve for intermittently emitting a quantity of water through mist port 528 when irrigation control valve 500 is operating in mist irrigation mode.

A working fluid, such as water, is provided to irrigation control valve 500 from a source (not shown) at a given pressure and flow rate to irrigation control valve 500 via water supply tube 510. Nipple 512 extending from control valve body 520 pierces water supply tube 510 to couple irrigation control valve 500 to the working fluid supply source. Water supply tube 510 provides a self-sealing feature which allows a water tight connection to be made between water supply tube 510 and irrigation control valve 500. Passageway 524, molded into control valve body 520, provides fluid communication from water supply tube 510 into chamber 522 via flow regulator 550 as will be discussed further. Bracket 590 cooperates with control valve body 520 to capture and secure water supply tube 510 onto irrigation control valve 500.

Control valve body 520 includes housing 530 having chamber 522 formed therein and base 536 coupled to housing 530 to substantially enclose chamber 522. In the present embodiment latch 532 extends downward from housing 530 to engage tab 540 formed on base 536, thereby securing base 536 to housing 530. In addition, upwardly extending tab 534 formed in housing 530 cooperates with bracket 590 and downwardly extending tab 540 formed in base 536 to further secure base 536 to housing 530. While the present embodiment illustrates the use of tabs and brackets to secure housing 530 to base 536, any means of fastening these components may be incorporated herein without deviating from the scope of the invention.

Second valve assembly 580, disposed within chamber 522, divides chamber 522 into accumulation chamber 542 and vented chamber 544. Accumulation chamber 542 is in fluid communication with water supply tube 510, drip port 526 and mist port 528 as heretofore described. Vent port 538 formed in base 536 is in fluid communication with vented chamber 544 to provide a chamber having substantially atmospheric pressure.

As previously identified, flow regulator 550 is interdisposed between first passageway 524 and accumulation chamber 542 to provide pressure compensating flow control of the water flow rate into accumulation chamber 542. In the present embodiment, annular wall 551 is formed within and extends from control valve body 520. In addition, a labyrinthine channel 552 is formed in the outer wall of housing 530 and has a first end in fluid communication with first passageway 524 and a second end in fluid communication with accumulation chamber 542. This configuration of a flow regulator is illustrated and further described above in reference to FIG. 7B. A flexible membrane 554 substantially covers and engages labyrinthine channel 552 such that labyrinthine channel 552 and membrane 554 defines a flow regulating passageway 555 having a first end in fluid communication with first passageway 524 and a second end in fluid communication with accumulation chamber 542. Cap 556 engages annular wall 551 and urges flexible membrane 554 onto labyrinthine channel 552. Seal 558 surrounds annular wall 551 and provides a water tight seal between cap 556 and annular wall 551. In the present embodiment, cap 556 and membrane 554 are removably positionable onto housing 530 so that these components may be disassembled and flow regulator 550 periodically cleaned of debris which may be transported through water supply tube 510.

In operation, water transported into flow regulator 550 may have a significant variation in water pressure. As this water pressure increases and decreases, membrane 554 flexes to expand or constrict flow regulating passageways 555 such that a substantially stable flow rate and water pressure is provided into accumulation chamber 542 in a manner well known in the art. While the present embodiment is particularly described and illustrated with a flow regulator having a labyrinthine channel, one skilled in the art would readily recognize that any flow regulating device which provides a substantially stable water pressure to accumulation chamber 542 could be incorporated into the present invention without deviating from the scope of the present invention.

Drip passageway 546 is formed in housing 530 to provide fluid communication between accumulation chamber 542 and drip port 526. As will be described in further detail below, first valve assembly 560 is interdisposed between accumulation chamber 542 and drip port 526 for alternately selecting drip irrigation mode or mist irrigation mode. Housing 530 further includes internal conduit 547 disposed within accumulation chamber 542 along the longitudinal axis of control valve body 520. A plurality of ribs 549 extend radially from internal conduit 547 to the surface of accumulation chamber 542 to position and support internal conduit 547. Mist passageway 548 extends through internal conduit 547 and provides fluid communication between accumulation chamber 542 and mist port 528. As will be described in further detail, second valve assembly 580 is disposed in the bottom of accumulation chamber 542 and cooperates with internal accumulation conduit 547 for alternately providing fluid communication between accumulation chamber 542 and mist port 528.

In the present embodiment, first valve assembly 560 is a pressure activated valve which selectively opens or closes drip passageway 546 in response to a control signal provided by air supply tube 570. Valve diaphragm 564 is interdisposed between housing 530 and base 536, such that valve diaphragm 564 intersects drip passageway 546. Base 536 includes nipple 566 extending downward to pierce air supply tube 570 and has passageway 568 passing therethrough to provide fluid communication between air supply tube 570 and valve chamber 562 formed in base 536. Downwardly extending tab 540 formed on base 536 captures and positively positions air supply tube 570. Bracket 590 engages tab 540 and air supply tube 570 to maintain fluid coupling between air supply tube 570 and irrigation control valve 500 in a manner similar to water supply tube 510.

Figure 4:
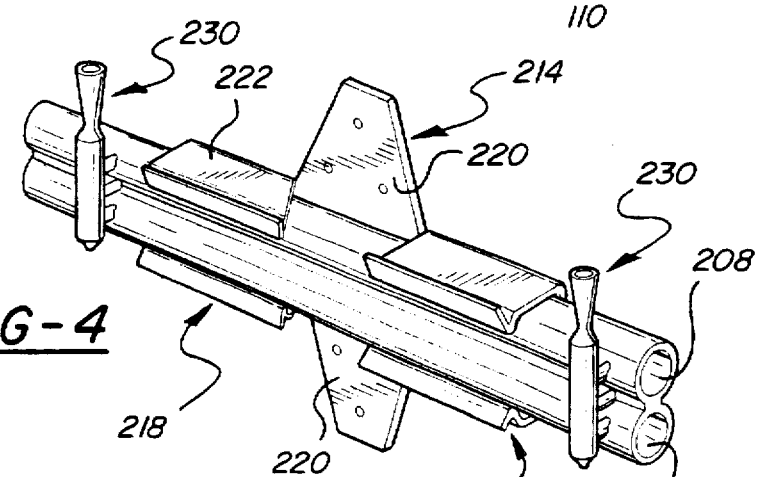
FIG. 4 is a perspective of a bracket for retaining the irrigation lines and appropriately positioning and targeting the irrigation control valve shown in FIG. 3.

In the preferred embodiment, bracket 590 may also be used to mount irrigation control valve 500 in its appropriate environment. Thus, a bracket similar to that illustrated and described in reference to FIGS. 4 and 5 would provide a presently preferred means for securing water supply tube 510, air supply tube 570 and irrigation control valve 500. By combining the mounting functions and the securing functions into a single bracket, a mounting system is provided which allows for an effective means of aligning and targeting the mist irrigation and drip irrigation which is insensitive to impact from other agricultural operations which are performed in the fields.

In operation, first valve assembly 560 utilizes a static pressure provided in air supply tube 570 to urge valve diaphragm 564 upwardly, thus closing drip passageway 546 and preventing fluid communication from accumulation chamber 542 to drip port 526. While the present embodiment described a pressure actuated valve for selectively opening or closing drip passageway 546 one skilled in the art would readily recognize that any valve assembly capable of opening or closing drip passageway 546 in response to a control signal would effectively function in the present invention. For example, an electrically activated valve could be substituted for valve assembly 560 and an electrical signal could be substituted for the static air pressure control signal described above.

Figure 10:
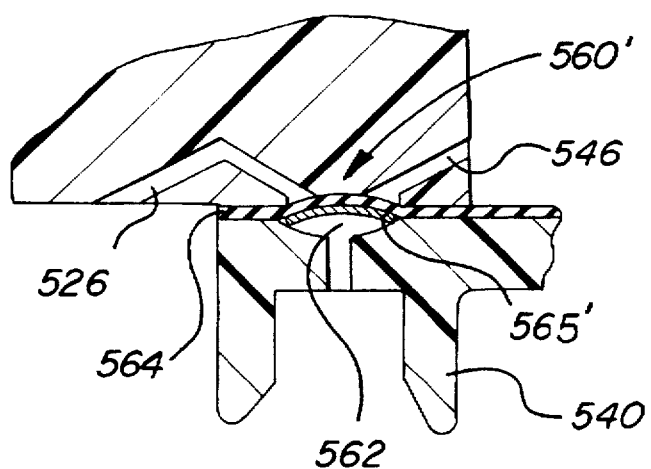
FIG. 10 is a cross-section of the diaphragm assembly of the irrigation control valve shown in FIG. 8 illustrating an alternate embodiment incorporating a bi-metallic disc spring member which is responsive to the ambient temperature for alternatively providing drip irrigation and mist irrigation.

Alternatively, a thermally activated valve assembly could be substituted for valve diaphragm 564 such that drip passageway 546 would be closed when the ambient temperature surrounding irrigation control valve 500 decreased below a predetermined value such that mist irrigation would automatically provide frost protection when the ambient temperature reached a critical temperature. As illustrated in FIG. 10, bi-metallic disc 565' positioned within first valve assembly 560' under diaphragm 564 such that at ambient temperatures substantially above 32° F., diaphragm 564 and disc 565' are concave-shaped and allow fluid communication from accumulation chamber 542 to drip port 526. When the ambient temperature approaches 32° F., bimetallic disc 565' deflects to a convex shape as a result of the difference in coefficient of thermal expansion of the two materials. In this position, diaphragm 564 seals off drip passageway 546' in a manner similar to that described above.

As previously described, second valve assembly 580 provides a pressure relief valve between accumulation chamber 542 and mist port 528 to generate a pulsating or intermittently emitting mist irrigation. In the present embodiment, second valve assembly 580 includes disc spring member 582 secured within base 536 and valve diaphragm 584 overlaying disc spring member 582 and being captured between housing 530 and base 536. While in the present embodiment, valve diaphragm 564 and 584 are a single unitary piece, one skilled in the art would readily recognize that these diaphragms could be separate components. In its normal or undeformed state disc spring member 582 maintains a convex shape such that valve diaphragm 584 sealably engages internal conduit 547 thereby preventing fluid communication between accumulation chamber 542 and mist passageway 548. As pressure builds in accumulation chamber 542 the force acting on disc spring member 582 increases to a point greater than the spring constant of disc spring member 582. When this occurs disc spring member 582 displaces downwardly and takes on a concave shape, thus revealing mist passageway 548 and allowing water to be communicated from accumulation chamber 542 to mist port 528. The release of water from accumulation chamber 542 causes a pressure drop therein and decreases the load acting on disc spring member 582. When this force decreases below a reset value, disc spring member 582 displaces back into its original convex shape and diaphragm 584 conceals mist passageway 548 again.

While various methods of manufacture and materials may be used to fabricate disc spring member 582, it is presently preferred that a stamped stainless steel disc be used in this application. Furthermore, the design of disc spring member 582 should be such that the load at which disc spring member 582 displaces from a convex shape to a concave shape, the trip load, is greater than the load at which disc spring member 582 displaces from the concave shape back to the convex shape, the reset load. By incorporating a step between the trip load and reset load, disc spring member 582 provides a dwell time necessary for evacuation of a calibrated amount of water through mist passageway 548 and out mist port 528.

Figure 9:
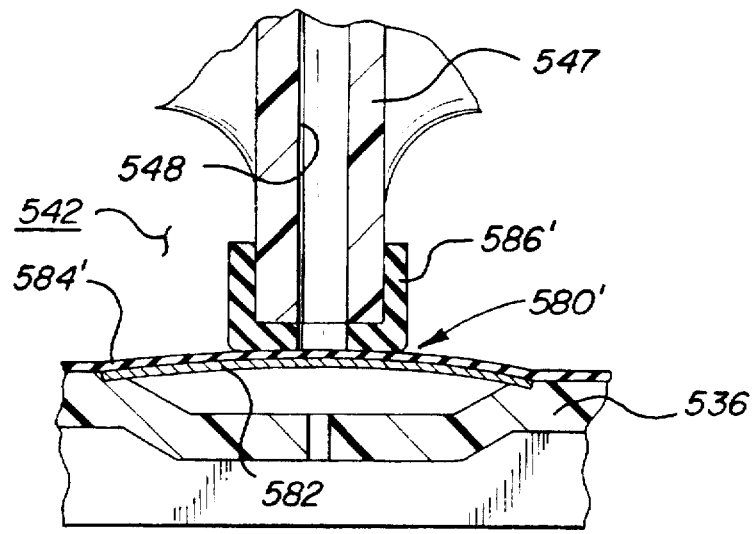
FIG. 9 is a cross-section of the pressure relief valve of the irrigation control valve shown in FIG. 8 illustrating an annular seal disposed on the control valve body rather than molded into the diaphragm of the pressure relief valve.
Figure 8:
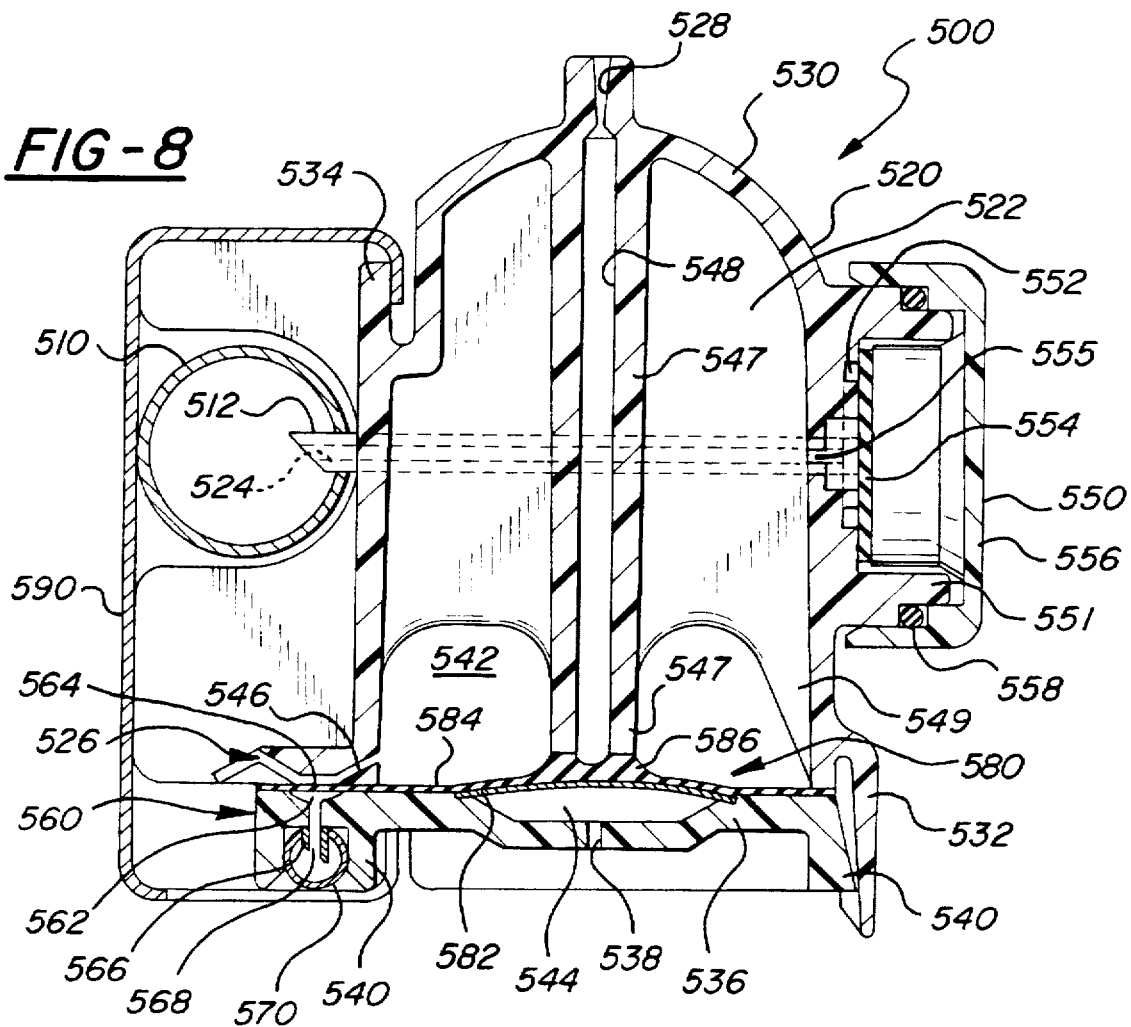
FIG. 8 is a cross-section of a fifth preferred embodiment of an irrigation control valve of the present invention having a water supply tube and a static air pressure control line wherein the displaceable structure is a diaphragm assembly responsive to the static air pressure in the control line, the irrigation control valve further includes a pressure relief valve for intermittently revealing and concealing the mist port to provide pulsating water flow during mist irrigation.
Figure 11:
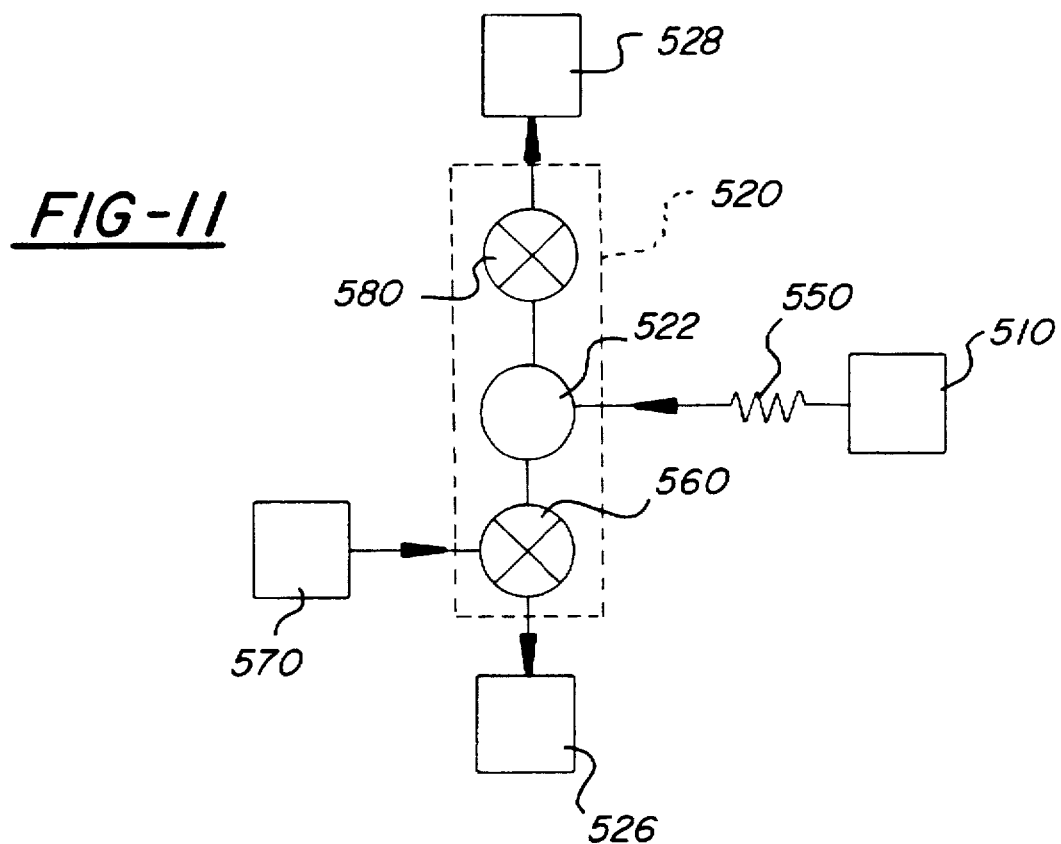
FIG. 11 illustrates the irrigation control valve of FIG. 8 in hydraulic schematic representation.

In the present embodiment, valve diaphragm 584 includes raised annular portion 586 for engaging and sealing internal conduit 547. Raised annular portion 586 may be formed into valve diaphragm 584 or may include a separate seal which engages internal conduit 547. Raised annular portion 586 accommodates small linear displacements of disc spring member 582 while the pressure builds in accumulation chamber 542 and maintain the seal between valve diaphragm 584 and internal conduit 547. Referring now to FIG. 9, an alternate means of sealing internal conduit 547 can be achieved by disposing elastomeric cap 586' on internal conduit 547'. Cap 586' has sufficient compliance to accommodate the small linear displacement of disc spring member 582 while maintaining the water tight seal with valve diaphragm 584' between accumulation chamber 542 and internal conduit 547.

While second valve assembly 580 in the present embodiment has been described as a disc spring member/valve diaphragm assembly, one skilled in the art would readily appreciate that any valve assembly which alternatively provides fluid communication between accumulation chamber 542 and mist port 528 in response to the pressure present in accumulation chamber 542 could be incorporated into the present invention without deviating from the scope thereof.

Furthermore, in the present embodiment, irrigation control valve 500 includes control valve body 520 having a single drip port 526 and a single mist port 528 as a unit. However, the present invention is adaptable to provide multiple drip ports 526 and/or mist ports 528 in fluid communication with a single control valve body 526. In this embodiment, individual outlet tubes would branch off of drip port 526 and mist port 528 to provide a plurality of drip ports and mist ports which could be appropriately positioned and targeted by bracket 590. This would minimize the cost of the irrigation system by reducing the number of control valves used.

The operation of irrigation control valve 500 will now be described with particular reference to the structures described above. In typical drip mode operation water from supply line 510 is transported through first passageway 524 into flow regulator 550 which substantially stabilizes the water flow rate provided to irrigation control valve 500. An atmospheric or low pressure signal is provided in air supply tube 570, thus establishing fluid communication from accumulation chamber 542 to drip port 526 via drip passageway 546. Water which accumulates in accumulation chamber 542 at a desired flow rate dictated by the design of flow regulator 550 is transported through drip passageway 546 and is emitted from drip port 526 at a calibrated drip rate.

To operate irrigation control valve 500 in a pulsating mist irrigation mode, an increased or high static pressure change is provided in air supply tube 570 by any of a variety of means including a hand bicycle pump, a small compressor, an air tank or any similar device. This control signal is communicated through passageway 568 into valve chamber 562 where it acts on valve diaphragm 564. Valve diaphragm 564 is displaced into and substantially closes off drip passageway 546, thus preventing water emission from drip port 526 and allowing water to accumulate in accumulation chamber 542.

Accumulation chamber 542 contains a dead-headed air volume and as water flows through flow regulator 550 and into accumulation chamber 542, it compresses the resident air and builds pressure until the pressure in accumulation chamber 542 reaches the trip pressure of second valve assembly 580. When the trip pressure is reached in accumulation chamber 542, disc spring member 582 displaces from its convex shape to its concave shape, thus revealing mist passageway 548 and allowing water under pressure to be emitted from accumulation chamber 542 and out of mist port 528. As the air residual in chamber 542 expands, the water is pushed out through mist port 528 and emitted from irrigation control valve 500, and the pressure in accumulation chamber 542 drops until the reset pressure of disc spring member 582 is reached. When this reset pressure is reached, disc spring member 582 displaces back from its concave shape to its convex shape, thus concealing mist passageway 548 and allowing pressure in accumulation chamber 542 to build again and the pulse cycle is repeated.

In operation, second valve assembly 580 remains open for a dwell time to allow water in accumulation chamber 542 to be emitted from irrigation control valve 500. Variables which affect the dwell time and amount of water ejected from irrigation control valve 500 in mist irrigation mode include the trip pressure and reset pressure of disc spring member 582, the volume of accumulation chamber 542 and the sizing of mist passageway 548 and mist port 528.

Figure 12:
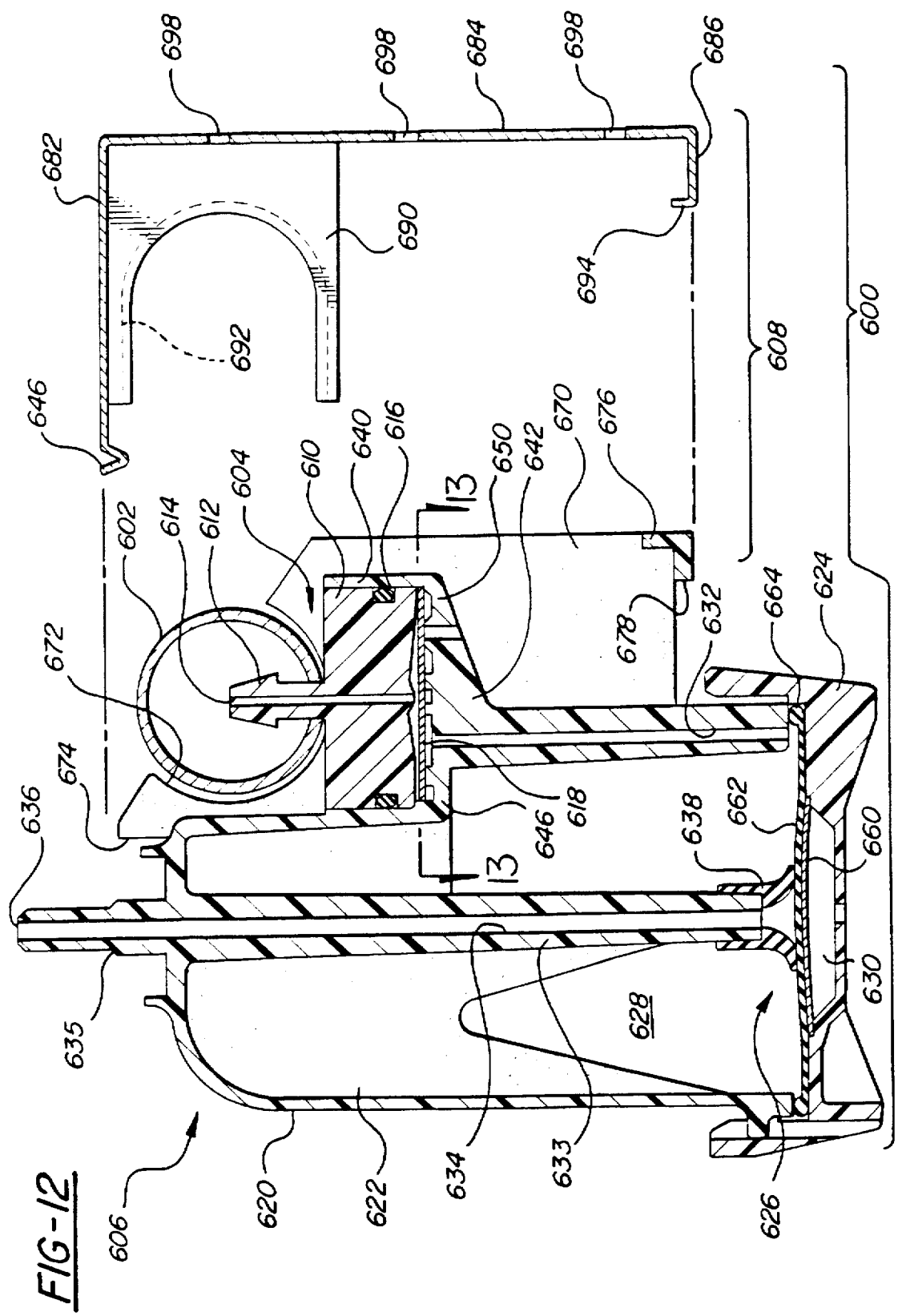
FIG. 12 is a cross-section of a sixth preferred embodiment of a mist-only irrigation control valve for converting a constant, low-volume flow rate input into a pulsated, high-volume flow rate mist output and having a pressure relief valve assembly for bleeding pressure from the accumulation chamber during periods of non-use, whereby working fluid is discharged on to the ground adjacent the irrigation control valve.

Referring now to FIG. 12, irrigation system 600 is illustrated for providing a pulsated, high-volume flow rate mist irrigation from a water source of the type utilized in drip irrigation systems. Irrigation system 600 includes water supply tube 602, flow regulator assembly 604, irrigation control valve 606 and bracket assembly 608.

As presently preferred, water is supplied from water supply tube 602 via flow regulator assembly 604 into irrigation control valve 606. Irrigation control valve 606 converts the substantially constant, low-volume flow rate input into a pulsated, high-volume flow rate mist which is discharged from irrigation control valve 606. Bracket assembly 608 provides means for readily installing irrigation control valve 606 at appropriate locations, and further provides means for securing water supply tube 602 onto irrigation control valve 606.

Flow regulator assembly 604 is received within irrigation control valve 606 to provide a fluid tight seal therewith and includes cap 610 having nipple 612 formed thereon and inlet passageway 614 for providing fluid communication from water supply tube 602 to irrigation control valve 606. O-ring 616 is disposed around an outer edge of cap 610 to provide sealing engagement of cap 610 with irrigation control valve 606. Flexible membrane 618 is interdisposed between cap 610 and irrigation control valve 606 for providing pressure compensated flow input to irrigation control valve 606 as further described herein.

Irrigation control valve 606 includes housing 620 having chamber 622 formed therein and base 624 coupled to housing to substantially enclose chamber 622. Mist valve assembly 626 is interdisposed between housing 620 and base 624 to divide chamber 622 into accumulation chamber 628 and vented chamber 630. Housing 620 further includes valve inlet passageway 632 formed therein for providing fluid communication from flow regulator assembly 604 to the lower portion of accumulation chamber 628. Similarly, housing 620 has conduit 633 generally extending from the bottom of housing 620 through accumulation chamber 628. Mist passageway 634 is formed in conduit 633 and terminates outside of housing 620 at mist port 636. A shoulder portion 635 is formed on a portion of conduit 633 outside of housing 620 which enables various diverters or discharge attachments to be incorporated into irrigation control valve 606. For example, a detachable diverter may be secured to shoulder portion 635 to direct the spray in a desired direction or to generate a fine mist. While the terms mist and spray are used synonymously herein, one skilled in the art will readily appreciate that a mist is a spray discharge separated into fine water particles. Alternately, a diverter or discharge attachment may be integrally molded onto shoulder portion 635. Furthermore, shoulder portion 635 may be removed from irrigation control valve 606 so that an extension tube may to be secured to conduit 633. The use of an extension tube enables a spray to be discharge in a location away from irrigation control valve 606, i.e., from above the crops.

Mist valve assembly 626 is responsive to the pressure within accumulation chamber 628 to periodically reveal and conceal mist passageway 634, thus alternately establishing and interrupting fluid communication therebetween to provide an intermittent discharge of water from irrigation control valve 606. More specifically, mist valve assembly 626 includes disc spring 660 and diaphragm seal 662 interdisposed between housing 620 and base 624 beneath mist passageway 634. Annular bead 664 is formed integrally with diaphragm seal 662 to provide a fluid tight seal between housing 620 and base 624. Disc spring 660 is designed to quickly deflect, i.e., snap, from a generally convex position to a generally flat or slightly concaved position when the force applied to the upper surface thereof reaches a first value (referred to as the trip point). Disc spring 660 is also designed to quickly return to the convex position when the force acting on the upper surface thereof is reduced below a second value (referred to as the reset point). In addition, disc spring 660 is designed to have minimal deflections when a force less than the trip point is applied to the upper surface thereof. As presently preferred, the trip point is greater than the reset point to provide a rapidly opening and closing valve assembly with sufficient dwell between opening and closing to permit an adequate volume of water to be emitted from irrigation control valve 606. Skirted seal 638 disposed on the lower portion of mist passageway 634 seals off mist passageway 634 and accommodates small deflections of disc spring 660, thereby maintaining the closed condition of mist valve assembly 626 while pressure builds in accumulation chamber 628.

Housing 620 has a recess formed therein defined by annular sidewall 640 and bottom 642 for receiving flow regulator cap 610 therein. O-ring 616 engages annular sidewall 640 to sealably secure cap 610 therein. Labyrinthine channel 644 is formed in bottom 642 and cooperates with flexible membrane 618 to provide pressure regulated flow input into irrigation control valve 606. More specifically, water is supplied from water supply tube 602 through inlet passageway 614 of cap 610 onto an upper surface of flexible membrane 618. Working fluid is then directed into channel inlet 646 of labyrinthine channel 644, as best seen in FIG. 13, travels the torturous path of labyrinthine channel 644 and is discharged at channel outlet 648. Pressure compensated flow regulation is provided by cooperation of flexible membrane 618 with labyrinthine channel 644, in a manner well known in the art. Accordingly, working fluid is discharged from flow regulator assembly 604 at a substantially constant, low-volume flow rate into accumulation chamber 628 directly adjacent base 624 via valve inlet passageway 632.

With reference to FIGS. 12 and 13, pressure relief valve assembly 650 is disposed within annular sidewall 640 and provides means for relieving the pressure within accumulation chamber 628 during periods when irrigation control valve 606 is not in use. Pressure relief valve assembly 650 includes pressure relief chamber 652 formed in the bottom 642, annular pressure relief valve seat 654 tapering upwardly from pressure relief chamber 652 to the opening of pressure relief passageway 656. Pressure relief passageway 656 extends through housing 620 and terminates at pressure relief orifice 658. As such, pressure relief valve assembly 650 cooperates with flexible membrane 618 for providing fluid communication between accumulation chamber 628 and pressure relief orifice 658 in response to the pressure biasing of flexible membrane 618 and permitting working fluid to flow in a reverse direction from accumulation chamber 628 through valve inlet passageway 632 and pressure relief passageway 656 and out of pressure relief orifice 658 onto the ground adjacent irrigation control valve 606.

The operation of irrigation system 600 will now be described with particular reference to FIGS. 12 through 14. Water from water supply tube 602 is transported through flow regulator assembly 604 to provide a substantially constant, low-volume flow rate to accumulation chamber 628 at a pressure above the ambient pressure within accumulation chamber 628 which contains a deadheaded air volume. In this state, mist valve assembly 626 engages skirted seal 638 to conceal mist passageway 634. As best seen in FIG. 12, disc spring 660 compresses skirted seal 638 causing it to spread radially outwardly to sealably engage with diaphragm seal 662. Accordingly, water flows into accumulation chamber 628 to compress the resident air therein. As pressure builds within accumulation chamber 628, the force acting on the upper surface of disc spring 660 increases causing small deflections of mist valve assembly 626. The pressure in accumulation chamber 628 also deforms skirted seal 638 radially inwardly to maintain engagement of skirted seal 638 with diaphragm seal 662 to provide a pressure compensated seal. When the force generated by the pressure in accumulation chamber 628 acting on mist valve assembly 626 becomes greater than the trip point, disk spring 660 quickly snaps from its convex shape to a substantially flat, or slightly concaved shape, thus revealing mist passageway 634 and allowing the water under pressure to be emitted from accumulation chamber 628 and out of mist port 636. As best seen in FIG. 14, the converging geometry of skirted seal 638 accelerates the flow of water from accumulation chamber 628 through mist passageway 634 and out of mist port 636. As the water is discharged from accumulation chamber 628, the pressure therein drops until the force acting on mist valve assembly is less than the reset point of disk spring 660. At which point disk spring 660 snaps back from its flat or slightly concaved shape to the original convex shape. Upon return of the disk spring 660 to the convex shape, diaphragm seal 662 engages skirted seal 638 to conceal mist passageway 634, allowing pressure to build again within accumulation chamber 628. Thus, the pulsating mist cycle is re-initiated.

Upon shutdown of irrigation system 600, the source of working fluid (not shown) is turned off, thus disabling the supply of pressurized working fluid in water supply tube 602. In certain circumstances, the pressure within accumulation chamber 628 is greater than the pressure within water supply tube 602. When this occurs, a back pressure is developed within irrigation control valve 606 which causes flexible membrane 618 to be biased upwardly to engage the bottom portion of cap 610 and conceal inlet passageway 614, thus acting as a check valve to prevent fluid communication from accumulation chamber 628 to water supply tube 602. Furthermore, the upward biasing of flexible membrane 618 establishes fluid communication between valve inlet passageway 632 and pressure relief valve assembly 650. More specifically, the displacement of flexible membrane 618 upwardly conceals inlet passageway 614 and establishes fluid communication from valve inlet passageway 632 through or around labyrinthine channel 644 through pressure relief chamber 652 and pressure relief passageway 656 out of pressure relief orifice 658. In this manner, the water accumulated within irrigation control valve 606 is discharged from accumulation chamber 628 onto the ground adjacent irrigation control valve 606 to relieve the pressure in accumulation chamber 628.

The present invention includes a pressure relief valve assembly to maintain the desired deadheaded air volume within accumulation chamber 628. However, it may at times be desirable to re-charge accumulation chamber 628 with air. In this regard, water supply tube 602 may be purged with compressed air to displace working fluid from accumulation chamber 628 with compressed air.

Referring now to FIG. 15, an alternate embodiment of the pressure relief valve assembly in accordance with the present invention is illustrated. Similar to the preferred embodiment illustrated in FIG. 12, working fluid is supplied from water supply tube 602' into accumulation chamber 628' through flow regulator assembly 604'. Thus, pressure compensated flow regulation is achieved in a manner similar to that heretofore described. Additionally, pressure relief valve assembly 650' is provided to relieve the pressure within accumulation chamber 628' during periods of non-use of irrigation control valve 606'. Pressure relief valve assembly 650' includes pressure relief inlet passageway 651' communicating between inlet passageway 614' and pressure relief chamber 652'. Pressure relief back flow passageway 655' provides fluid communication between accumulation chamber 628' and pressure relief chamber 652'. Flexible membrane 618' divides pressure relief chamber 652' and engages pressure relief valve seat 654'. Pressure relief passageway 656' provides fluid communication from pressure relief chamber 652' through housing 620' and out of irrigation control valve 606' at pressure relief orifice 658' to atmosphere. During operation of irrigation control valve 606', the pressure in water supply tube 602' pushes flexible membrane 618' downwardly onto valve seat 654' to close pressure relief back flow passageway 655'. Since the area of pressure relief chamber 652' adjacent pressure relief inlet passageway 651' is larger than the area of pressure relief back flow passageway 655', flexible membrane 618' seals pressure relief back flow passageway 655' even when the pressure in accumulation chamber 628' and water supply tube 602' are equal. Thus, similar to pressure relief valve assembly 650, pressure relief valve assembly 650' enables working fluid within accumulation chamber 628' to be drained from irrigation control valve 606' during periods of non-use.

Referring now to the alternate embodiment illustrated in FIG. 15, pressure relief valve assembly 650' operates in a similar manner. More specifically, during operation of irrigation control valve 606', a positive pressure differential between water supply tube 602' and accumulation chamber 628' biases flexible membrane 618' downwardly to provide pressure compensated flow control into accumulation chamber 628 and disable pressure relief valve assembly 650'. More specifically, the pressure differential between pressure relief chamber 652' and accumulation chamber 628' urges flexible membrane 618' downwardly onto pressure relief valve seat 654', thus concealing pressure relief back flow passageway 655'. When irrigation system 600' is shutdown, the pressure differential between accumulation chamber 628' and pressure relief chamber 652' is reversed, such that a higher pressure exists in accumulation chamber 628'. As such, flexible membrane 618' is urged upwardly to establish fluid communication between pressure relief back flow passageway 655' and pressure relief passageway 656'. Accordingly, working fluid within accumulation chamber 628' is discharged out of pressure relief orifice 658' to atmosphere and onto the ground adjacent irrigation control valve 606'.

Referring now to FIG. 16, a second alternate embodiment of the present invention may pressure relief valve assembly which drains the working fluid from the accumulation chamber back into the water supply tube rather than onto the ground during periods of non-use. In this alternate embodiment, pressure relief valve assembly 650" is substantially similar to pressure relief valve assembly 650 with the exception that pressure relief passageway 656" provides fluid communication between labyrinthine channel inlet 646" and inlet passageway 614". Thus, during operation of irrigation control valve 606", fluid pressure from water supply tube 602" biases flexible membrane 618" downwardly to provide pressure compensated working fluid input into accumulation chamber 628" as heretofore described. When working fluid is no longer supplied through water supply tube 602", the pressure differential between accumulation chamber 628" and water supply tube 602" reverses, such that accumulation chamber 628" has a higher pressure than water supply tube 602". This pressure differential urges flexible membrane 618" upwardly to interrupt fluid communication between accumulation chamber 628" and inlet passageway 614". However, pressure relief passageway 656" provides an alternate path of communication between accumulation chamber 628" and inlet passageway 614", thus enabling the working fluid accumulated in accumulation chamber 628" to be drained back into water supply tube 602".

Referring again to FIG. 12, bracket assembly 608 provides means for detachably securing irrigation control valve 606 to a stake or post (not shown). More specifically, irrigation control valve 606 includes a pair of flange walls extending in a parallel fashion outwardly from the housing 620. Flange walls 670 are interconnected at a central portion by mist valve assembly 626 and at lower portion by L-shaped cross member 676. Arcuate recess 672 is formed in the upper portion of flange walls 670 for receiving water supply tube 602. Upper catch 674 is formed on flange walls 670 and lower catch 678 is formed on cross member 676 to provide an interface to detachably secure irrigation control valve 606 to bracket assembly 608. Bracket assembly 608 further includes metal bracket 680 having upper horizontal wall 682, vertical wall 684 and lower horizontal wall 686 defining a generally L-shaped bracket. Retainer portion 688 is generally orthogonal to upper horizontal wall 682 and vertical wall 684 and extends inwardly towards irrigation control valve 606. Retainer portion 688 has arcuate recess 690 formed therein to receive water supply tube 602 when metal bracket 680 is detachably secured to irrigation control valve 606. Lip 692 is formed on the interior edge of arcuate recess 690 for engaging water supply tube 602 while preventing abrasion and rupture thereof. Lower latch 694 is formed on the free end of lower horizontal wall 686 and is engageable with lower catch 678. Similarly, V-shaped upper latch 696 is formed on the free end of upper horizontal wall 682 and is engageable with upper catch 674 to detachably secure irrigation control valve 606. Aperture 698 is formed through vertical wall 684 to secure metal bracket 680 to a post or stake.

Irrigation control valve 606 may be appropriately located within an agricultural environment in the following manner. Metal bracket 680 is secured with threaded fasteners or wire (not shown) received through aperture 698 to a post, stake or trellis portion (not shown). Water supply tube 602 is secured to irrigation control valve 606 in a manner heretofore described. Irrigation control valve 606 is positioned closely adjacent metal bracket 680 such that lower catch 678 engages lower latch 694. Irrigation control valve 606 is then rotated in a clockwise direction as shown in FIG. 12 such that water supply tube 602 is disposed within arcuate recess 690. The angular orientation of flange walls 670 causes upper latch 696 to displace upwardly slightly as metal bracket 680 is moved into position. Once in the appropriate position, upper latch 696 engages upper catch 674 to detachably secure irrigation control valve 606 to metal bracket 680. In this position, retainer portion 688 positions and secures water supply tube 602 onto irrigation control valve 606. Irrigation control valve 606 may be removed from metal bracket 680 by freeing upper latch 696 from upper catch 674 so that irrigation control valve 606 may be removed therefrom.

Referring now to FIG. 17, a seventh preferred embodiment of the present invention is illustrated wherein irrigation control valve 706 selectively provides drip irrigation and mist irrigation in response to a remotely generated control signal communicated to irrigation control valve 706. Housing 720 of irrigation control valve 706 is generally cylindrical-shaped and includes flow regulator assembly recess 722 and drip valve assembly recess 724 formed in an outer surface thereof and accumulation chamber 728 defined within the interior of housing 720. The valve inlet passageway 732 provides fluid communication between accumulation chamber 728 and flow regulator assembly recess 722. Similarly, drip passageway 736 provides fluid communication between accumulation chamber 728 and drip valve assembly recess 724 and drip port 738 provides fluid communication from drip valve assembly recess 724 out of irrigation control valve 706. Bracket assembly 708 detachably secures irrigation control valve 606 to a post or stake as heretofore described.

Irrigation control valve 706 is adapted to receive preassembled flow regulator assembly 704. More specifically, flow regulator assembly 704 includes cap 710 having nipple 712 extending outwardly therefrom for piercing water supply tube 702. Flow regulator assembly 704 further includes base 714 having nipple 715 extending inwardly therefrom into valve inlet passageway 732. Labyrinthine channel 716 is formed on a face of base 714 adjacent cap 710 and cooperates with flexible membrane 718 to provide pressure compensated flow regulation to irrigation control valve 706 as heretofore described. In this regard, various commercially available flow regulator assemblies, such as Turbo-SC™ by Hardie, may be readily adapted into irrigation control valve 706 to provide a constant low-volume flow rate input of working fluid to irrigation control valve 706.

Irrigation control valve 706 further includes drip valve assembly 740 to selectively provide drip irrigation and mist irrigation in response to a remotely generated control signal. Control signal tube 703 is operably coupled to drip valve assembly 740 for switching between drip irrigation mode and mist irrigation mode. More specifically, drip valve assembly 740 includes cap 742 sealably engaged within drip valve assembly recess 724 to define drip chamber 746 between cap 742 and housing 720. Nipple 748 extends outwardly from cap 742 and pierces control signal tube 703 to provide fluid communication with drip chamber 746. Drip passageway 736 provides fluid communication between accumulation chamber 728 and drip chamber 746. Drip port 738 provides fluid communication from drip chamber 746 to atmosphere. As presently preferred, drip port 738 is located in the lowermost portion of accumulation chamber 728 to facilitate the pressure relief function of drip valve assembly during periods of non-use as further described hereafter. Flexible membrane 750 is disposed within drip chamber 746 to seal cap 742 in drip valve assembly recess 724. If necessary, an additional bead may be formed on flexible membrane 750 to improve the seal between cap 742 and housing 720. Flexible membrane 750 is also displaceable in drip chamber 746 to selectively establish and interrupt fluid communication between drip passageway 736 and drip port 738. In this regard, annular valve seat 752 is formed on the bottom surface of drip valve assembly recess 724 and cooperates with flexible membrane 750 to conceal drip passageway 736. Similarly, concave valve seat 754 is formed on a surface of cap 742 opposite nipple 748 and cooperates with flexible membrane 750 to reveal drip passageway 736 as shown in FIG. 17.

During drip irrigation mode, working fluid is supplied from water supply tube 702 through flow regulator assembly 704 into accumulation chamber 728 of irrigation control valve 706. Control signal tube 703 is evacuated to create a positive pressure differential between accumulation chamber 728 and drip chamber 746 (i.e., higher pressure in accumulation chamber 728 than in drip chamber 746) for urging flexible membrane 750 against concave valve seat 754. Thus, drip valve assembly 740 is in an open condition allowing working fluid to communicate from accumulation chamber 728 through drip passageway 736, drip chamber 746 and out of drip port 738. When it is desired to operate irrigation control valve 706 in a mist irrigation mode, a static pressure is applied to control signal tube 703 reverse the pressure differential between drip chamber 746 and accumulation chamber 728 (i.e., higher pressure in drip chamber 746 than in accumulation chamber 728). One skilled in the art will readily appreciate that due to the large area ratio of drip chamber 746 to drip passageway 736, only a nominal static pressure differential (<¼ the pressure within accumulation chamber 728) need be applied to control signal tube 703 in order to sufficiently close drip valve assembly 740. Upon application of a nominal static pressure differential, flexible membrane 750 is urged inwardly onto annular valve seat 752 to conceal drip passageway 736 and interrupt fluid communication between accumulation chamber 728 and drip port 738. Accordingly, working fluid fills accumulation chamber 728 until the trip pressure is reached, thus activating mist valve assembly (not shown) and resulting in the discharge of a mist irrigation as heretofore described.

During periods of non-use, the static pressure differential is once again evacuated from control signal tube 703 to establish a positive pressure differential between accumulation chamber 728 to drip chamber 746. Flexible membrane 750 is urged against concave valve seat 754 to reveal drip passageway 736. Working fluid accumulated in accumulation chamber 728 is discharged from irrigation control valve 706 via drip passageway 736, drip chamber 746 and drip port 738.

From the foregoing, those skilled in the art should realize that the present invention provides an irrigation control valve having a displaceable structure disposed within a control valve body and responsive to fluid pressure for alternately directing fluid to a drip port or a mist port. Although the invention has been described with particular reference to a number of preferred embodiments, variations and modifications can be effected within the spirit and scope of the following claims.

I claim:

1. An irrigation control valve for an irrigation system having a working fluid supply tube for supplying a pressurized working fluid to the irrigation control valve, said irrigation control valve comprising:

a control valve body having an accumulation chamber, an inlet passageway for providing fluid communication between the working fluid supply tube and said accumulation chamber and a mist passageway for providing fluid communication between said accumulation chamber and a mist port;

a mist valve assembly interdisposed between said accumulation chamber and said mist passageway and responsive to fluid pressure in said accumulation chamber to control fluid communication between said accumulation chamber and said mist passageway; and a pressure relief valve assembly in fluid communication with said accumulation chamber and operably coupled to said inlet passageway to relieve pressure in said accumulation chamber in response to pressure in said inlet passageway.

2. The irrigation control valve of claim 1 wherein said mist valve assembly intermittently provides fluid communication between said accumulation chamber and said mist passageway to discharge pressurized working fluid from said irrigation control valve at a pulsed, high-volume flow rate.

3. The irrigation control valve of claim 2 further comprising a flow regulator assembly interdisposed between the working fluid supply tube and said inlet passageway to provide pressurized working fluid to said irrigation control valve at a substantially constant, low-volume flow rate.

4. The irrigation control valve of claim 3 wherein said pressure relief valve assembly is operably associated with said flow regulator assembly to create a back flow of pressurized working fluid from said accumulation chamber through said inlet passageway.

5. The irrigation control valve of claim 4 wherein said pressure relief valve assembly operates as a check valve to prevent said back flow from returning to said inlet passageway and discharges said back flow into an environment adjacent said irrigation control valve.

6. The irrigation control valve of claim 5 wherein said back flow is returned to the working fluid supply tube.

7. An irrigation control valve for intermittently discharging a working fluid supplied to said irrigation control valve from a pressurized source via a working fluid supply tube, said irrigation control valve comprising:

a control valve body having a accumulation chamber formed therein, an inlet passageway having a first end in fluid communication with the working fluid supply tube and a second end in fluid communication with said accumulation chamber, and a mist passageway having a first end in fluid communication with said accumulation chamber and a second end terminating at a mist port;

a mist valve assembly disposed in said accumulation chamber and sealably engageable with said first end of said mist passageway, said mist valve assembly operable to quickly open into an open position by revealing said first end of said mist passageway and establishing fluid communication between said accumulation chamber and said mist passageway when pressure in said accumulation chamber is equal to or greater than a trip pressure, said mist valve assembly further operable to quickly close into a closed position by concealing said first end of said mist passageway and interrupting fluid communication between said accumulation chamber and said mist passageway when pressure in said accumulation chamber is less than a reset pressure.

8. The irrigation control valve of claim 7 wherein said reset pressure is less than said trip pressure to provide a dwell between said open position and said closed position.

9. The irrigation control valve of claim 7 wherein said mist valve assembly comprises a disc spring operably connected between said control valve body and said mist passageway and a seal engaging said mist passageway when said mist valve assembly is in said closed position.

10. The irrigation control valve of claim 9 wherein said seal comprises an annular seal surrounding said mist passageway and compensates for small deflections of said disc spring, thereby maintaining sealing engagement of said mist valve assembly with said mist passageway when pressure within said accumulation chamber is less than said trip pressure.

11. The irrigation control valve of claim 10 wherein said annular seal is responsive to pressure within said accumulation chamber to maintain engagement between said diaphragm and said mist passageway.

12. The irrigation control valve of claim 11 wherein said annular seal is a skirted annular seal.

13. The irrigation control valve of claim 7 further comprising a pressure relief valve assembly interdisposed between said inlet passageway and said accumulation chamber to relieve pressure within said accumulation chamber, said pressure relief valve assembly being responsive to pressure in said inlet passageway.

14. The irrigation control valve of claim 13 wherein said pressure relief valve assembly comprises:

a pressure relief chamber in fluid communication with said inlet passageway;

a back flow passageway providing fluid communication between said accumulation chamber and said pressure relief chamber;

a pressure relief passageway in fluid communication with said pressure relief chamber; and a flexible membrane disposed in said pressure relief chamber and responsive to pressure in said inlet passageway for interrupting fluid communication between said accumulation chamber and said pressure relief passageway when the pressure in said inlet passageway is in a high state and for establishing fluid communication between said accumulation chamber and said pressure relief passageway when the pressure in said inlet passageway is in a low state.

15. The irrigation control valve of claim 14 wherein said flexible membrane operates as a check valve to conceal inlet passageway and said pressure relief passageway discharges working fluid into an environment adjacent said irrigation control valve.

16. The irrigation control valve of claim 14 wherein said pressure relief passageway returns working fluid into said inlet passageway.

17. The irrigation control valve of claim 13 further comprising a flow regulator assembly coupled to said inlet passageway to provide a regulated flow rate of working fluid to said accumulation chamber.

18. The irrigation control valve of claim 17 wherein said flow regulator assembly is integral with said pressure relief valve assembly.

19. The irrigation control valve of claim 18 further comprising:

a recess formed in said housing and defining a bottom and an annular sidewall, said inlet passageway in fluid communication with said recess;

a cap disposed in said recess and having a passageway formed therein to provide fluid communication between the working fluid supply tube and said inlet passageway;

a pressure relief passageway in fluid communication with said recess; and a flexible membrane disposed between said cap and said bottom, said flexible membrane being responsive to pressure in said cap passageway for alternately providing said regulated flow rate and said pressure relief.

20. The irrigation control valve of claim 13 wherein said pressure relief valve is responsive to a control signal for providing drip irrigation from said pressure relief valve assembly when said control signal is at a low state.

21. The irrigation control valve of claim 7 further comprising means for maintaining sealing engagement of said mist valve assembly with said mist passageway when pressure in said accumulation chamber is less than said trip pressure.

22. The irrigation control valve of claim 11 wherein said annular seal is radially deflectable in response to pressure within said accumulation chamber.

* * * * *